US008611702B2

(12) United States Patent
Watari et al.

(10) Patent No.: US 8,611,702 B2
(45) Date of Patent: *Dec. 17, 2013

(54) IMAGE PROCESSING DEVICE AND MEDIUM STORING IMAGE PROCESSING PROGRAM

(71) Applicants: Takahiko Watari, Nagoya (JP); Tatsuya Sato, Ichinomiya (JP)

(72) Inventors: Takahiko Watari, Nagoya (JP); Tatsuya Sato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,351

(22) Filed: Oct. 26, 2012

(65) Prior Publication Data

US 2013/0050278 A1 Feb. 28, 2013

Related U.S. Application Data

(63) Continuation of application No. 12/153,641, filed on May 22, 2008, now Pat. No. 8,300,989.

(30) Foreign Application Priority Data

May 22, 2007 (JP) ................................. 2007-135295

(51) Int. Cl.
*G06K 9/03* (2006.01)
(52) U.S. Cl.
USPC ......................................... 382/309; 382/291
(58) Field of Classification Search
USPC .................................................. 382/309, 291
See application file for complete search history.

(56) References Cited

U.S. PATENT DOCUMENTS

| 6,593,938 B1 | 7/2003 | Sakata et al. |
| 6,727,909 B1 * | 4/2004 | Matsumura et al. .......... 345/629 |
| 6,922,201 B2 | 7/2005 | Blish et al. |
| 7,409,111 B2 | 8/2008 | Sakimura et al. |

(Continued)

FOREIGN PATENT DOCUMENTS

| JP | H10-293838 A | 11/1998 |
| JP | H11-308493 A | 11/1999 |

(Continued)

OTHER PUBLICATIONS

Japan Patent Office, Office Action for Japanese Patent Application No. 2007-135295 (counterpart to co-pending U.S. Appl. No. 12/153,641), mailed Aug. 9, 2011.

(Continued)

*Primary Examiner* — Li Liu
(74) *Attorney, Agent, or Firm* — Baker Botts L.L.P.

(57) ABSTRACT

An information interchange unit, a storage unit, and a display controller are configured such that, after a image selection unit selects a first image and a second image, the information interchange unit interchanges, automatically, first image information of the first image with second image information of the second image, or interchanges, automatically, first position information of the first image with second position information of the second image, the storage unit stores and correlates the first image information and the second position information, and stores and correlates the second image information and the first position information, and the display controller controls, automatically, a display to display the one image based on the first image information and the second position information, and the another image based on the second image information and the first position information.

72 Claims, 15 Drawing Sheets

(56) References Cited

U.S. PATENT DOCUMENTS

| | | | |
|---|---|---|---|
| 7,515,311 B2 | 4/2009 | Nakamura | |
| 7,743,322 B2* | 6/2010 | Atkins | 715/243 |
| 2004/0252316 A1 | 12/2004 | Miyagi et al. | |
| 2008/0180457 A1* | 7/2008 | Yamazaki | 345/619 |
| 2010/0149356 A1* | 6/2010 | Kim et al. | 348/211.8 |

FOREIGN PATENT DOCUMENTS

| | | |
|---|---|---|
| JP | H11-355556 A | 12/1999 |
| JP | 2005-079662 A | 3/2005 |
| JP | 2005-086382 A | 3/2005 |
| JP | 2005-229356 A | 8/2005 |
| JP | 2006-005840 A | 1/2006 |
| JP | 2006-067342 A | 3/2006 |
| JP | 2006-246120 A | 9/2006 |
| JP | 2006-285578 A | 10/2006 |
| JP | 2008-186095 A | 8/2008 |

OTHER PUBLICATIONS

Japan Patent Office, Office Action for Japanese Patent Application No. 2007-135295 (counterpart to co-pending U.S. Appl. No. 12/153,641), mailed Nov. 1, 2011.

Japan Patent Office, Office Action for Japanese Patent Application No. 2011-220720 (counterpart to co-pending U.S. Appl. No. 12/153,641), mailed May 8, 2012.

Japan Patent Office, Office Action for Japanese Patent Application No. 2011-220721 (counterpart to co-pending U.S. Appl. No. 12/153,641), mailed May 8, 2012.

Japan Patent Office, Notification of Reasons for Rejection for Japanese Patent Application No. 2012-245087 (counterpart to above-captioned patent application), mailed Jul. 9, 2013.

* cited by examiner

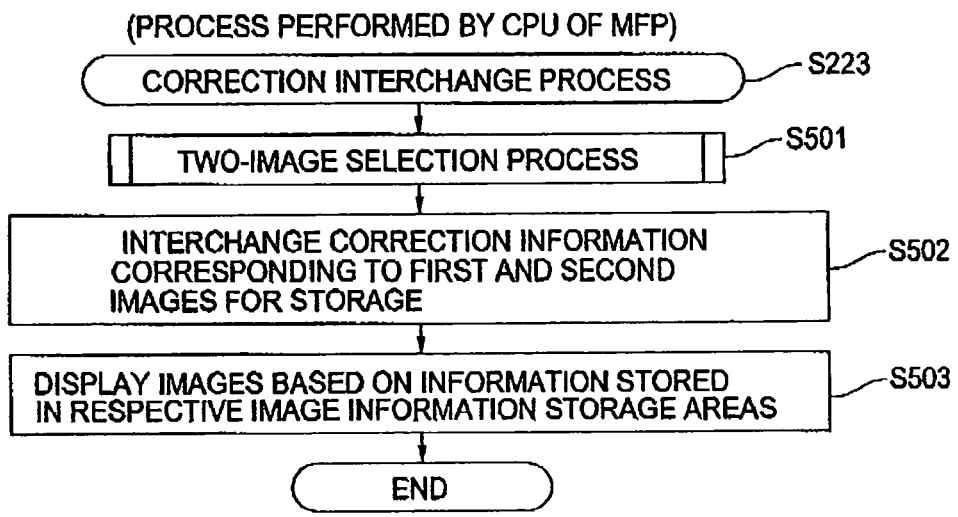
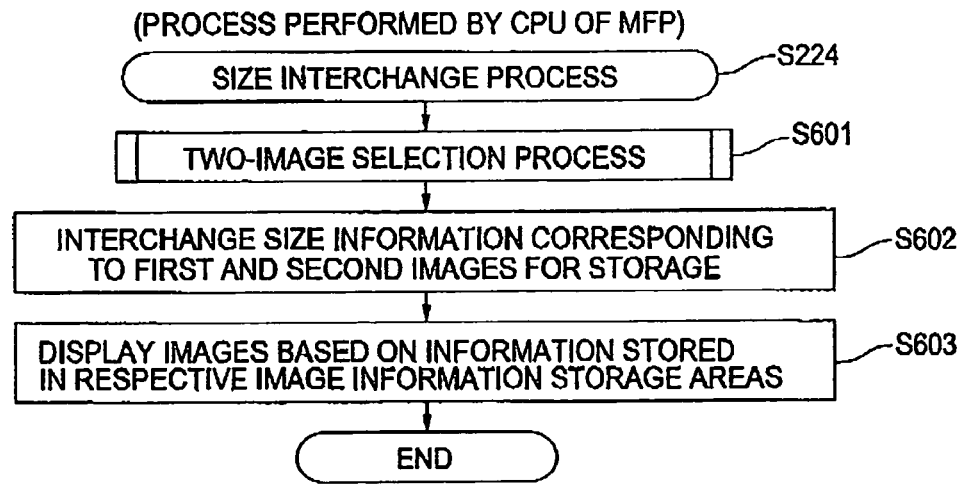

FIG.6A (PROCESS PERFORMED BY CPU OF MFP)

- COLOR INTERCHANGE PROCESS — S225
- TWO-IMAGE SELECTION PROCESS — S701
- INTERCHANGE COLOR INFORMATION CORRESPONDING TO FIRST AND SECOND IMAGES FOR STORAGE — S702
- DISPLAY IMAGES BASED ON INFORMATION STORED IN RESPECTIVE IMAGE INFORMATION STORAGE AREAS — S703
- END

FIG.6B (PROCESS PERFORMED BY CPU OF MFP)

- BRIGHTNESS INTERCHANGE PROCESS — S226
- TWO-IMAGE SELECTION PROCESS — S801
- INTERCHANGE BRIGHTNESS INFORMATION CORRESPONDING TO FIRST AND SECOND IMAGES FOR STORAGE — S802
- DISPLAY IMAGES BASED ON INFORMATION STORED IN RESPECTIVE IMAGE INFORMATION STORAGE AREAS — S803
- END

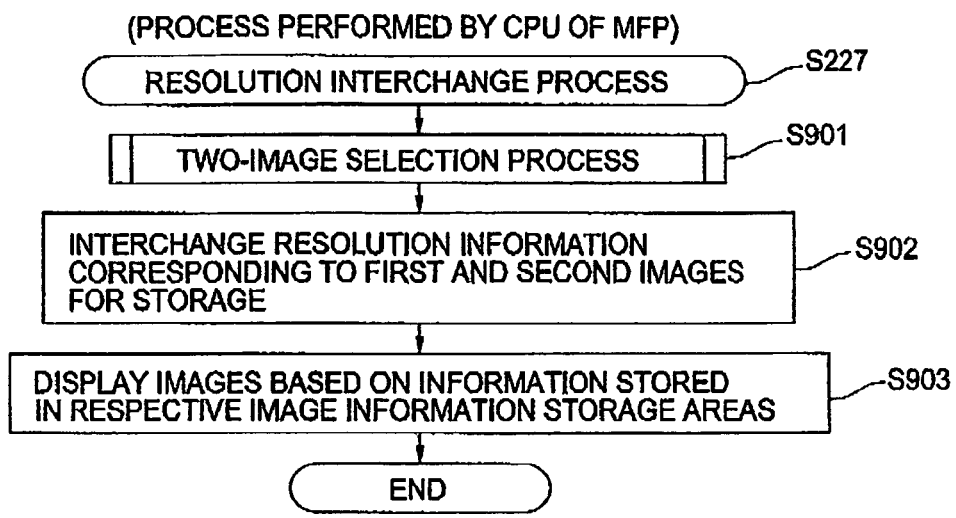
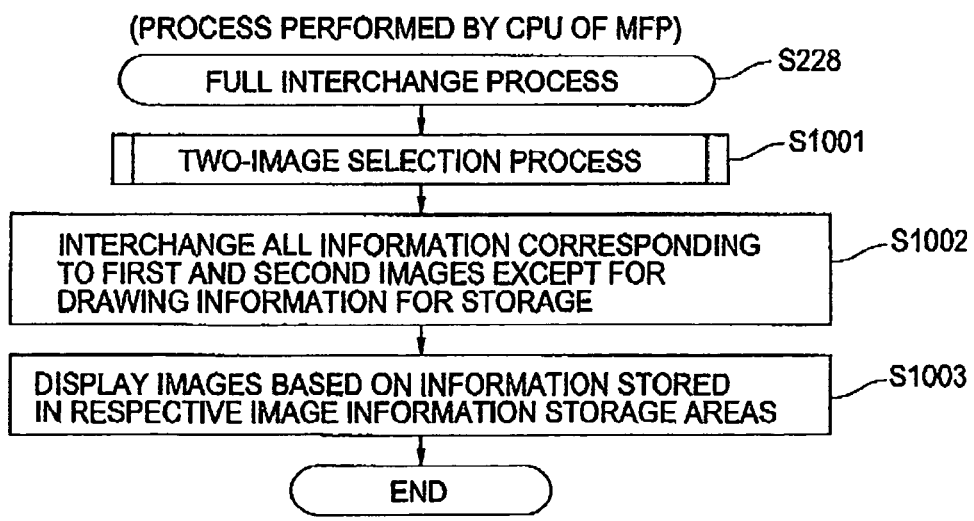

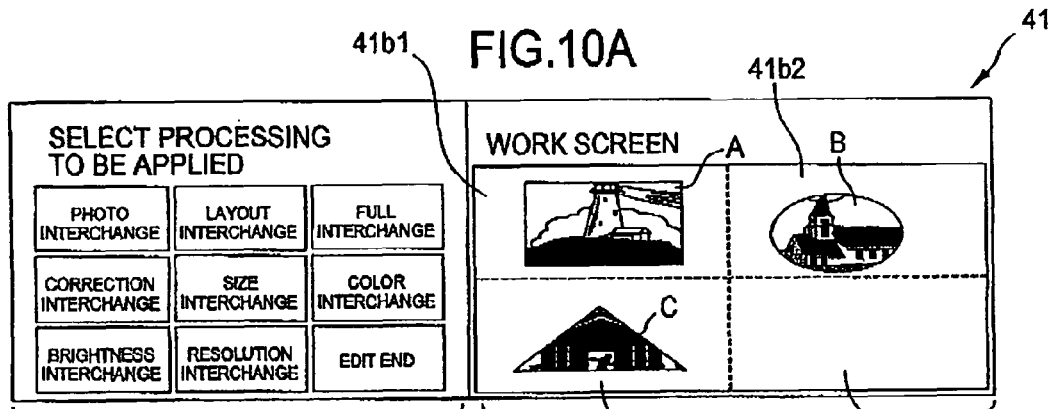
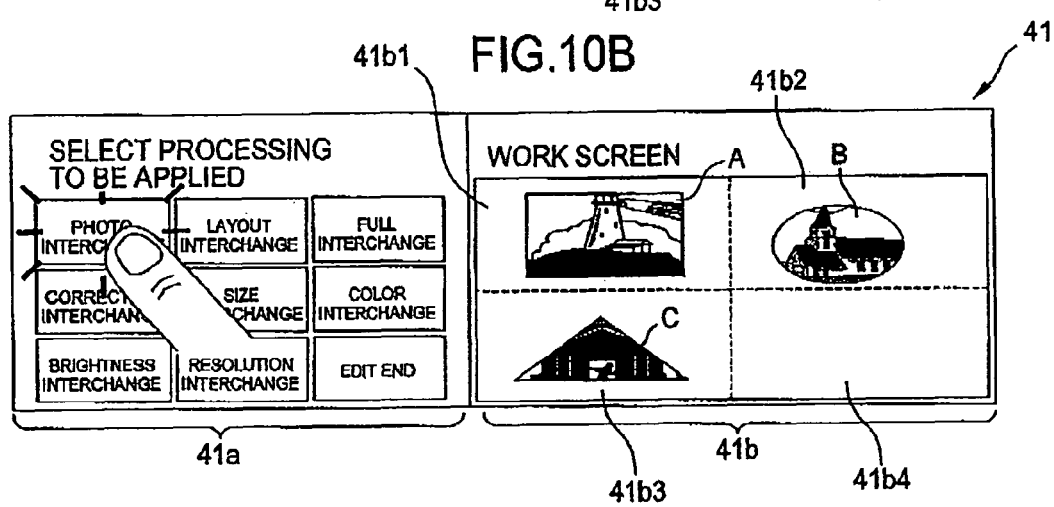
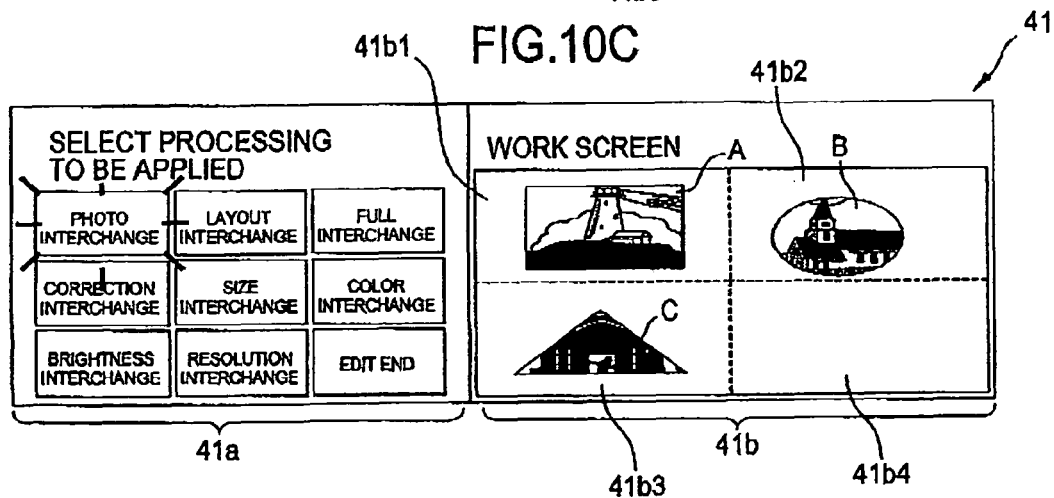

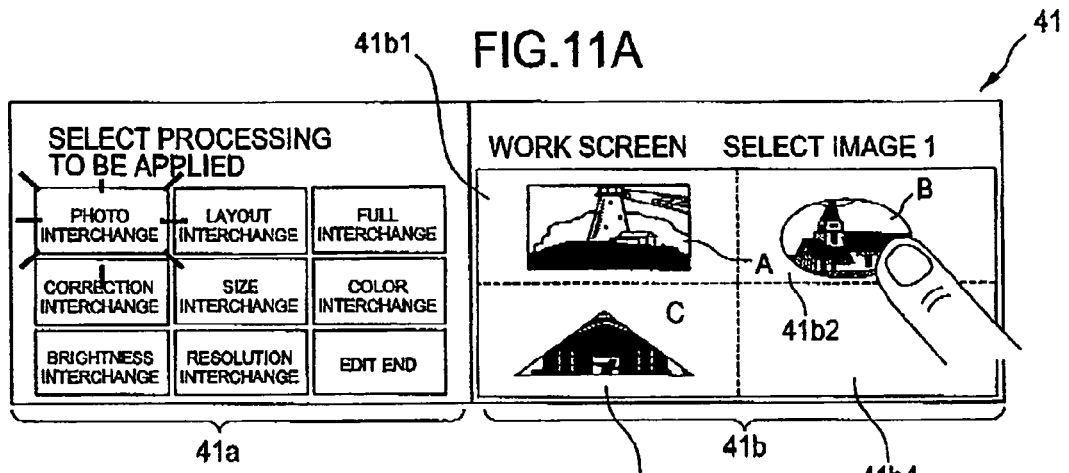
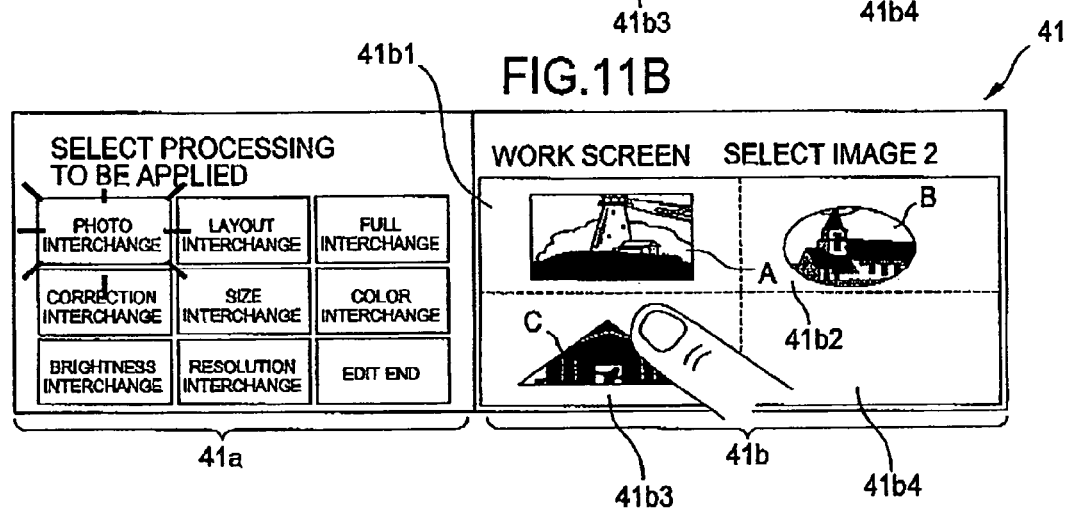
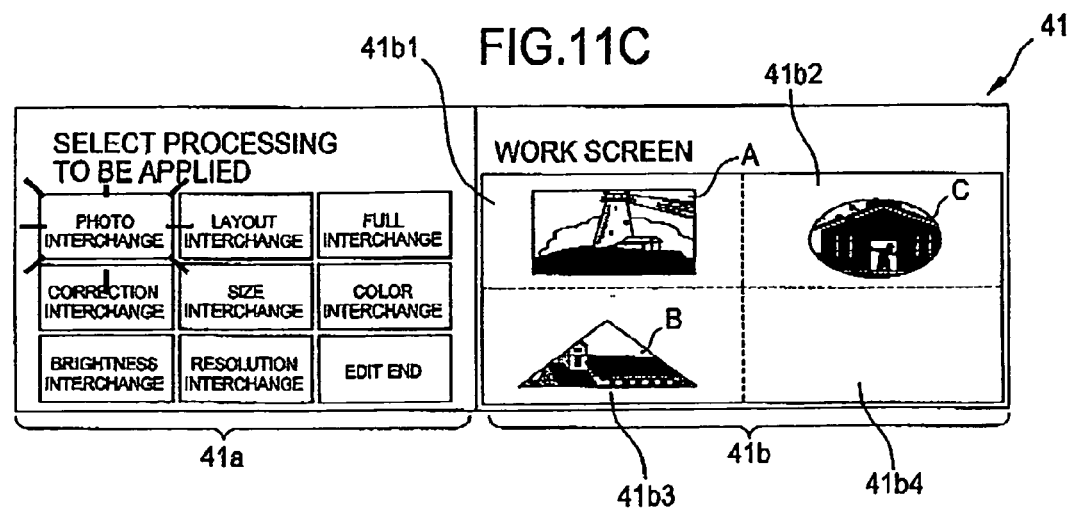

IMAGE PROCESSING DEVICE AND MEDIUM STORING IMAGE PROCESSING PROGRAM

CROSS REFERENCE TO RELATED APPLICATION

This application is a continuation of U.S. application Ser. No. 12/153,641, filed May 22, 2008, which claims priority from Japanese Patent Application No. 2007-135295 filed May 22, 2007. The entire content of this priory applications is incorporated herein by reference.

TECHNICAL FIELD

The present invention relates to an image processing device and an image processing program, and more particularly to an image processor and an image processing program capable of interchanging the positions or attributes of images displayed on a display screen with a simple operation.

BACKGROUND

As disclosed in Japanese Patent Application Publication No. H10-293838, there is known an image editing device that prepares various templates in which the color and design of the background of images, such as photos or pictures, to be displayed and positions of the images are previously set so as to allow a user to select a suitable one and displays the images based on the user's selected template. In this image editing device, when images and template are selected by the user, the images are displayed at positions defined by the template. Thus, with a simple operation of selecting a plurality of images and a template, a display screen reflecting an operator's desired arrangement of images and background can be set.

SUMMARY

However, although a desired display screen can be set with a simple operation of selecting a plurality of images and a template in the image editing device using the template, a template corresponding to an operator's desired arrangement of images and background is not always prepared. In the case where a template that matches an operator's desired arrangement is not prepared, the operator must select a template similar to one that matches the operator's desired arrangement and edit the positions, sizes, colors, and brightness of the displayed images, resulting in a troublesome editing operation.

For example, in the case where the position of a first image needs to be interchanged with the position of a second image, the following step needs to be performed: the first image is moved by a drag-and-drop operation to another location; then the second image is moved by a drag-and-drop operation to the location at which the first image has originally been positioned; and the first image that has been moved to another location is moved to the location at which the second image has originally been positioned. That is, at least three steps are required to complete the interchange of the displayed images, resulting in a troublesome editing operation. Further, in the case where the background set by the template is configured to white area the same as the arrangement positions of images, the operation of moving the images by a drag-and-drop operation to proper positions becomes difficult to carry out.

Further, if the attribute of each image, such as size, color, or brightness is associated with the arrangement position of each image, the operator must edit the attribute after the interchange operation of the images by a drag-and-drop operation, making the editing operation further troublesome.

The present invention has been made to solve the above problems, and an object of the present invention is to provide an image processing device and an image processing program capable of interchanging the positions or attributes of images displayed on a display screen with a simple operation.

To achieve the above and other objects, one aspect of the invention provides an image processing device including: a display configured to display a plurality of images; a display configured to display a plurality of images; a storage unit configured to store a plurality of pieces of image information and a plurality of pieces of position information corresponding to respective ones of the plurality of images individually, each of the plurality of pieces of position information indicating a position where each image is displayed on the display, the storage unit being configured to correlate the plurality of pieces of image information with respective ones of the plurality of pieces of position information individually, the plurality of images being to be displayed on the display based on the plurality of pieces of image information and the plurality of pieces of position information, respectively; an image selection unit configured to select at least a first image and a second image from the plurality of images, the first image including first image information and first position information, the second image including second image information and second position information; an information interchange unit configured to interchange the first image information of the first image with the second image information of the second image, or to interchange the first position information of the first image with the second position information of the second image, the storage unit being configured to store and correlate the first image information and the second position information, and store and correlate the second image information and the first position information; and a display controller configured to control the display to display one image based on the first image information and the second position information, and another image based on the second image information and the first position information. The information interchange unit, the storage unit, and the display controller are configured such that, after the image selection unit selects the first image and the second image, the information interchange unit interchanges, automatically, the first image information of the first image with the second image information of the second image, or interchanges, automatically, the first position information of the first image with the second position information of the second image, the storage unit stores and correlates the first image information and the second position information, and stores and correlates the second image information and the first position information, and the display controller controls, automatically, the display to display the one image based on the first image information and the second position information, and the another image based on the second image information and the first position information.

In another aspect of the present invention, there is provided an image processing device including: a display configured to display a plurality of images; a storage unit configured to store a plurality of pieces of image information corresponding to respective ones of the plurality of images, and attribute information corresponding to each of the plurality of pieces of image information, the attribute information being to be used for changing a display state of the image, each of the plurality of images being displayed on the display based on each of the plurality of image information and corresponding attribute information; an image selection unit configured to select at least a first image and a second image from the plurality of images, the first image including first image information and first attribute information, the second image including second image information and second attribute information; an information interchange unit configured to interchange the first image information of the first image with the second image information of the second image, or interchanges the first attribute information of the first image with the second attribute information of the second image, the storage unit being configured to store and correlate the first image information and the second attribute information, and store and correlate the second image information and the first attribute information; and a display controller configured to control the display to display one image based on the first image information and the second attribute information, and another image based on the second image information and the first attribute information. The information interchange unit, the storage unit, and the display controller are configured such that, after the image selection unit selects the first image and the second image, the information interchange unit interchanges, automatically, the first image information of the first image with the second image information of the second image, or interchanges, automatically, the first attribute information of the first image with the second attribute information of the second image, the storage unit stores and correlates the first image information and the second attribute information, and stores and correlates the second image information and the first attribute information, and the display controller controls, automatically, the display to display the one image based on the first image information and the second attribute information, and the another image based on the second image information and the first attribute information.

In another aspect of the present invention, there is provided a non-transitory computer-readable medium storing a computer-executable image processing program for an image processing device. The image processing device includes a display configured to display configured to display a plurality of images; a storage unit configured to store a plurality of pieces of image information and a plurality of pieces of position information corresponding to respective ones of the plurality of images individually, each of the plurality of pieces of position information indicating a position where each image is displayed on the display, the storage unit being configured to correlate the plurality of pieces of image information with respective ones of the plurality of pieces of position information individually, the plurality of images being to be displayed on the display based on the plurality of pieces of image information and the plurality of pieces of position information, respectively. The image processing program includes: instructions for selecting at least a first image and a second image from the plurality of images, the first image including first image information and first position information, the second image including second image information and second position information; instructions for interchanging the first image information of the first image with the second image information of the second image, or to interchange the first position information of the first image with the second position information of the second image, the storage unit being configured to store and correlate the first image information and the second position information, and store and correlate the second image information and the first position information; and instructions for controlling the display to display one image based on the first image information and the second position information, and another image based on the second image information and the first position information. After selecting the first image and the second image, interchanging, automatically, the first image information of the first image with the second image information of the second image, or interchanging, automatically, the first position information of the first image with the second position information of the second image, storing and correlating the first image information and the second position information, and storing and correlating the second image information and the first position information, and controlling, automatically, the display to display the one image based on the first image information and the second position information, and the another image based on the second image information and the first position information.

In another aspect of the present invention, there is provided a non-transitory computer-readable medium storing a computer-executable image processing program for an image processing device. The image processing device includes: a display configured to display a plurality of images; a storage unit configured to store a plurality of pieces of image information corresponding to respective ones of the plurality of images, and attribute information corresponding to each of the plurality of pieces of image information, the attribute information being to be used for changing a display state of the image, each of the plurality of images being displayed on the display based on each of the plurality of image information and corresponding attribute information. The image processing program includes: instructions for selecting at least a first image and a second image from the plurality of images, the first image including first image information and first attribute information, the second image including second image information and second attribute information; instructions for interchanging the first image information of the first image with the second image information of the second image, or interchanges the first attribute information of the first image with the second attribute information of the second image, the storage unit being configured to store and correlate the first image information and the second attribute information, and store and correlate the second image information and the first attribute information; and instructions for controlling the display to display one image based on the first image information and the second attribute information, and another image based on the second image information and the first attribute information. After selecting the first image and the second image, interchanging, automatically, the first image information of the first image with the second image information of the second image, or interchanging, automatically, the first attribute information of the first image with the second attribute information of the second image, storing and correlating the first image information and the second attribute information, and storing and correlating the second image information and the first attribute information, and controlling, automatically, the display to display the one image based on the first image information and the second attribute information, and the another image based on the second image information and the first attribute information.

BRIEF DESCRIPTION OF THE DRAWINGS

In the drawings:

FIGS. 5A to 5D are flowcharts each showing interchange process executed by the CPU of the MFP according to the embodiment;

FIGS. 6A to 6D are flowcharts each showing interchange process executed by the CPU of the MFP according to the embodiment;

FIGS. 10A to 10C are views showing the display screens of the liquid crystal display during the interchange process according to the embodiment; and FIGS. 11A to 11D are views showing the display screens of the liquid crystal display during the interchange process according to the embodiment. FIG. 1 is a perspective view of an ink-jet printer according to an embodiment of the present invention.

DETAILED DESCRIPTION

Figure 1:
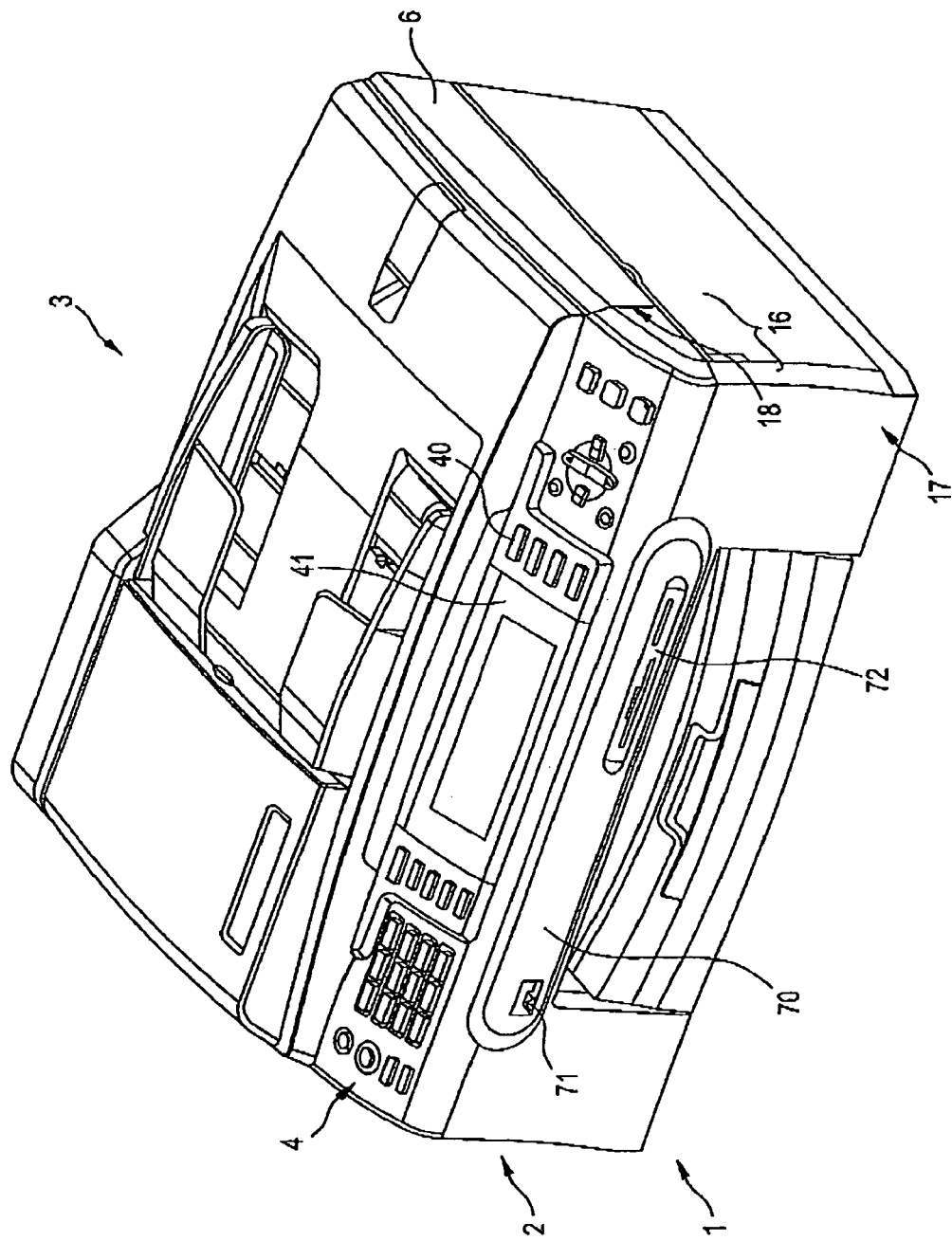
FIG. 1 is an external perspective view of a multifunction peripheral (MFP) according to an embodiment of the present invention.

Next, an image processing device and image processing program according to an embodiment of the present invention will be described with reference to the accompanying drawings. FIG. 1 is an external perspective view showing a multifunction peripheral 1 according to the embodiment of the present invention. The following embodiment is merely an example of embodying the present invention, and various modifications may be made without departing from the spirit and scope of the invention.

As shown in FIG. 1, the multifunction peripheral (MFP) 1 integrally includes a printer 2 at the lower portion thereof, a scanner 3 at the upper portion thereof, and an operation panel 4 on the front side of the scanner 3. The MFP 1 implements various functions, such as a copy function, a facsimile function, a printer function of recording (printing) data received from an external computer (not shown) such as a personal computer (PC) onto a recording paper. The internal configuration of the scanner 3 is not directly relevant to the present invention and hence no detailed description will be given.

The printer 2 is an image recording unit that records an image onto a recording paper based on image data scanned by the scanner 3 or externally input image data. The printer 2 is provided at the lower portion of the scanner 3. The scanner 3 and printer 2 are so positioned to have a common rear surface, so that the rear surface of the MFP 1 has a flat shape having no concave or convex portion.

The scanner 3 includes a flat bed 6 having a horizontally-long rectangular parallelepiped shape. A front side end surface 17 of the printer 2 is protruded to the front side by a predetermined length from a front side end surface 18 of the scanner 3. Hereinafter, the front side portion of the printer 2 protruding to the front side from the scanner 3 is referred to as a protruded portion 16. The horizontal length of the printer 2 is so designed to fit to the horizontal length of the scanner 3. Therefore, the MFP 1 has substantially a square shape as viewed from the above.

A connection panel 70 is provided on the upper side of an opening 5 of the printer 2. The connection panel 70 has a USB terminal 71 on its left end side. The USB terminal 71 is a connector terminal for communicably connecting the MFP 1 through a USB connection to an external device. The connection panel 70 has a slot portion 72 on its right end side. The slot portion 72 includes a plurality of card slots into which a memory card (card-type memory) can be inserted. When a card slot is inserted into one of the card slots, image data is read out by a control section 20 (see FIG. 2) described later from the inserted memory card.

An operation panel 4 is provided on the front side of the MFP 1. The operation panel 4 has a horizontally-long shape so as to fit to the open space above the protruded portion 16. In other words, the operation panel 4 has a vertical size that is substantially equal to the length (vertical length of the open space) obtained by subtracting the vertical length of the printer 2 from the vertical length of the scanner 3. The operation panel 4 is used for a user to operate the printer 2 or scanner 3, and includes various operation keys 40 and a liquid crystal display (LCD) 41. A user can input a desired instruction by using the operation panel 4. The LCD 41 is composed of two horizontally-arranged LCD panels each with an aspect ratio of 4:3, so that the entire aspect ratio of the LCD 41 is 8:3. When a predetermined instruction is input to the MFP 1, the MFP 1 is controlled by a control section 20 (see FIG. 2) based on the input information (the predetermined instruction).

The MFP 1 is configured to operate based on not only an instruction input through the operation panel 4 but also an instruction transmitted through a printer driver or scanner driver from a computer such as a PC connected to the MFP.

Figure 2:
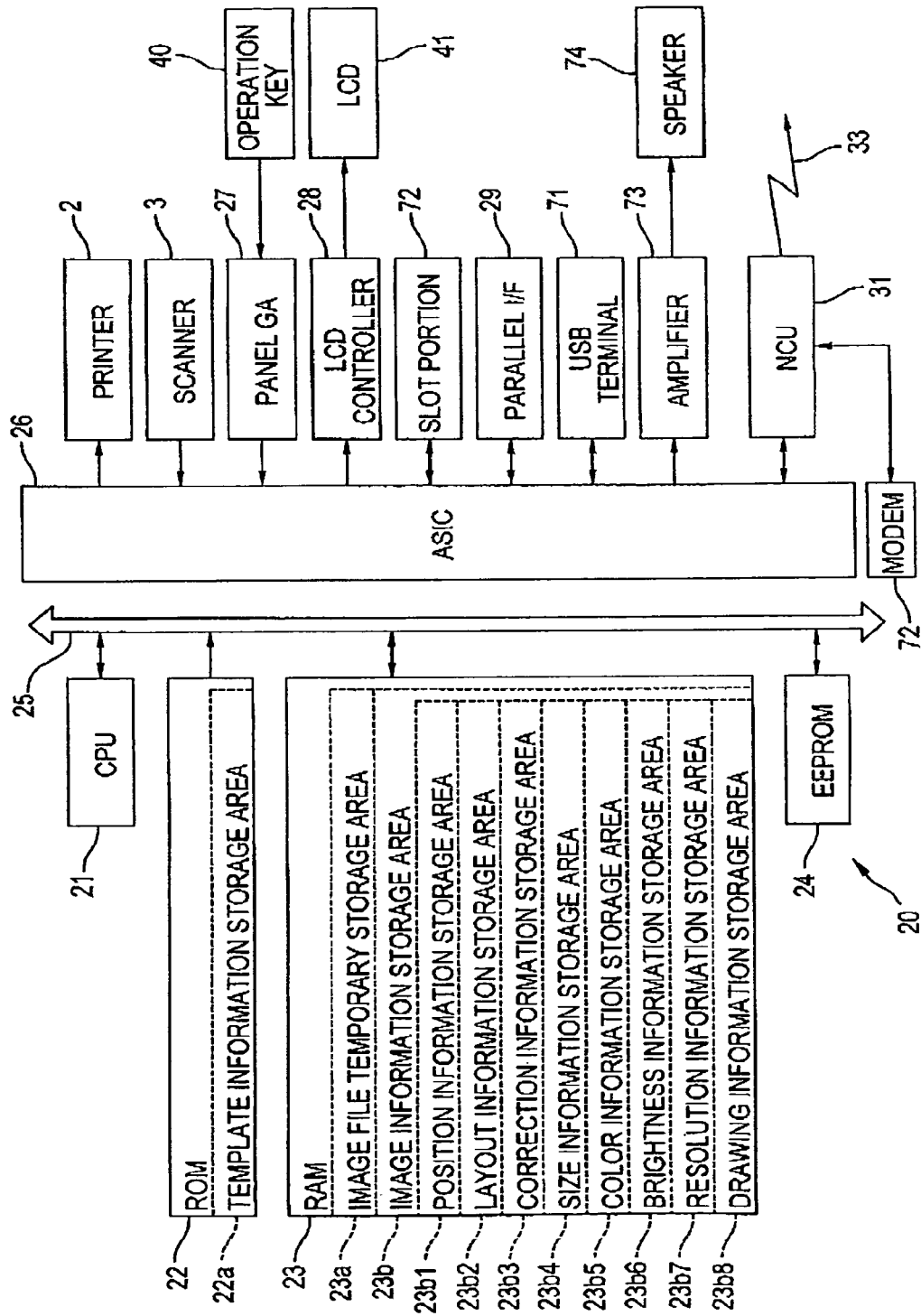
FIG. 2 is a block diagram showing an electrical configuration of the MFP according to the embodiment.

With reference to FIG. 2, an electrical configuration of the MFP 1 according to the present embodiment will be described. FIG. 2 is a block diagram showing an electrical configuration of the MFP 1. The MFP 1 includes a parallel interface (I/F) 29 which is connectable to a PC via a cable, a USB terminal 71 connectable to a digital camera, and a slot portion 72 to which an external medium (e.g., storage medium such as a memory card or flash memory) can detachably attached. With this configuration, image data can be input from the PC, digital camera, external medium to the MFP 1. The MFP 1 can perform an album creation process described later (see FIG. 3) for the input image data.

The control section 20 controls the entire operation of the MFP 1 including the printer 2, scanner 3, and operation panel 4 (see FIG. 1). The control section 20 is constituted as a microcomputer mainly including a CPU (Central Processing Unit) 21, a ROM (Read Only Memory) 22, a RAM (Random Access memory) 23, and an EEPROM (Electrically Erasable and Programmable ROM) 24. The control section 20 is connected to an ASIC (Application Specific Integrated Circuit) 26 via a bus 25.

The CPU 21 controls the entire operation of the MFP 1. The ROM 22 stores various control programs (e.g., programs shown in flowcharts of FIGS. 3 through 7) executed by the CPU 21 and stores fixed values used when the programs are executed.

The ROM 22 has a template information storage area 22a. The template information storage area 22a stores a plurality of template information defining the position and shape of images to be displayed. In this embodiment, the template information storage area 22a stores a plurality of templates corresponding to the number of images to be displayed as one template information and stores the template information corresponding to the number of images to be displayed.

The RAM 23 is a rewritable memory employed as a memory area or work area that temporarily stores various data used when the CPU 21 executes the various programs. The RAM 23 has a variable memory area dynamically allocated to a program to be executed, in addition to a fixed memory area reserved as a load area for a program instructed to be loaded on start-up of the MFP 1 and an area for storing fixed values essential for each processes. At the time of execution of each program, a memory area (storage area or work area) required for the operation of the program is reserved in a free space (unused area) of the variable memory area.

Further, the RAM 23 has an image file temporary storage area 23a for storing information read out from a memory card (not shown) inserted into the slot portion 72 and an image information storage area 23b for storing information (attribute information) indicating edit data added or applied to an image. The image information storage area 23b is prepared for each image selected in an album creation process described later (see FIG. 3).

The image file to be stored in the image file temporary storage area 23a is e.g., known bit map data composed of pixel values (RGB values) for each pixel. The RGB values include components representing the three primary colors of light, i.e., an R value representing red, a G value representing green, and a B value representing blue. The greater the RGB values, the higher the luminance (brightness). The image file further includes information indicating the size, color, and resolution of an image and correction information applied to an image.

The image information storage area 23b has a position information storage area 23b1, a layout information storage area 23b2, a correction information storage area 23b3, a size information storage area 23b4, a color information storage area 23b5, a brightness information storage area 23b6, a resolution information storage area 23b7, and a drawing information storage area 23b8.

When the album creation process described later (see FIG. 3) is executed to set a position of an image, the position information storage area 23b1 stores position information indicating the position of the image in a display screen of the LCD 41. The position information indicating the position of an image in a display area is, e.g., information representing a coordinate value.

When the album creation process is executed to set a shape or a contour of an image, the layout information storage area 23b2 stores layout information (shape information) indicating the shape of the image. The layout information indicating the shape of an image is information representing, e.g., a shape such as circle, triangle, quadrangle, and star shape.

The correction information storage area 23b3 stores correction information indicating correction that has been applied to an image. The correction information storage area 23b3 stores the correction information corresponding to images stored in the image file temporary storage area 23a. The correction information is information representing correction such as edge correction for image edge enhancement or feathering correction for feathering the edge of an image.

The size information storage area 23b4 stores size information indicating a size of an image. The size information storage area 23b4 stores the size information corresponding to images stored in the image file temporary storage area 23a.

The color information storage area 23b5 stores color information indicating colors (color blending) added to an image. The color information storage area 23b5 stores the color information corresponding to images stored in the image file temporary storage area 23a.

The brightness information storage area 23b6 stores brightness information indicating brightness added to an image. The brightness information storage area 23b6 stores the brightness information corresponding to images stored in the image file temporary storage area 23a.

The resolution information storage area 23b7 stores resolution information indicating a resolution (fineness) of an image. The resolution information storage area 23b7 stores the resolution information corresponding to images stored in the image file temporary storage area 23a.

The drawing information storage area 23b8 stores drawing information of original image data. The original image data is processed (edited) based on the abovementioned layout information, correction information, size information, color information, brightness information, or resolution information.

The ASIC 26 connected to the control section 20 via the bus 25 will be described below. A panel gate array (panel GA) 27 is connected to the ASIC 26. The panel GA 27 detects a depression (input operation) of a given operation key 40 used for a user to input user's desired instruction to the MFP 1 and outputs a predetermined code signal. Further, the ASIC 26 is connected to an LCD controller 28 for controlling the screen display of the LCD 41, an amplifier 73 for sounding a speaker 74, and an NCU (Network Control Unit) 31 which is connected to a general public line 33 and a modem 32.

Next, the album creation process executed in the MFP 1 having the configuration described above will be described with reference to flowcharts shown in FIGS. 3 through 7 and display screens of the LCD 41 shown in FIGS. 8A through 11D. FIGS. 3 through 7 are flowcharts showing the album creation process executed by the CPU 21 of the MFP 1, and FIGS. 8A through 11D are views showing display screens of the LCD 41.

The album creation process is executed when an operator operates the operation key 40 to select the album creation function. In this embodiment, the MFP 1 is configured to be able to execute the album creation function when a memory card is inserted. Thus, when the memory card is inserted by the operator, image files such as photos or pictures stored in the memory card are loaded into the image file temporary storage area 23a.

Further, the MFP 1 may be configured to be able to execute the album creation function not only when the memory card is inserted but also when image files are received from the external PC.

Figure 3:
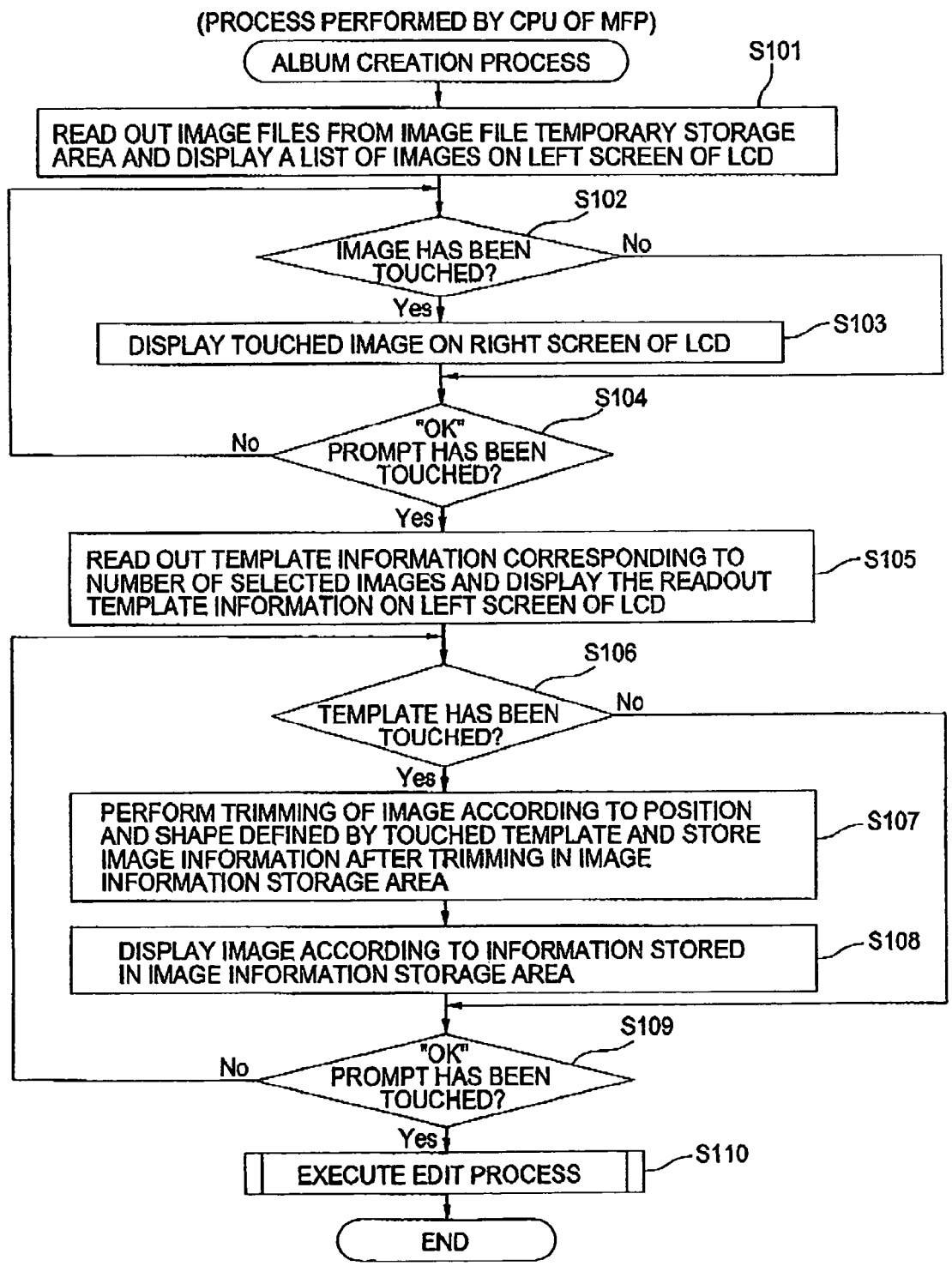
FIG. 3 is a flowchart showing a album creation process executed by a CPU of the MFP according to the embodiment.

FIG. 3 is a flowchart showing the album creation process executed by the CPU 21 of the MFP 1. In the following description, a state of the display screen of the LCD 41 is changed with progress of the album creation process. The change of the display screen of the LCD 41 will be described with reference to FIGS. 8A through 11D.

Figure 8A:
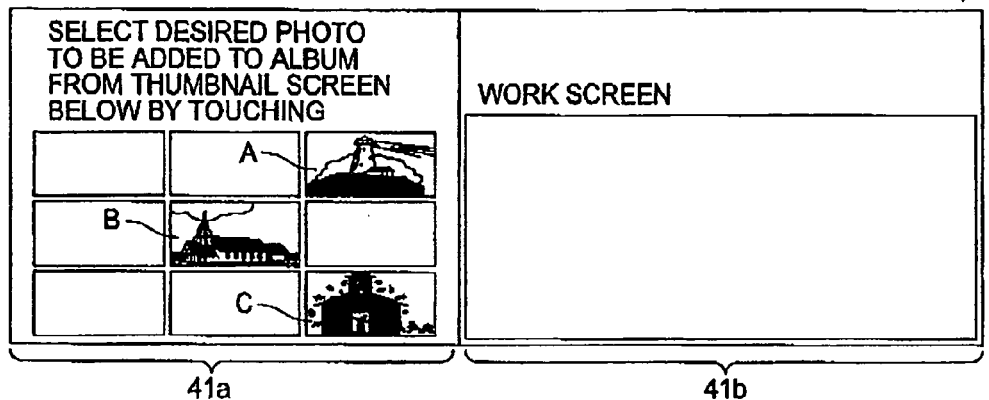
FIGS. 8A to 8D are views showing display screens of a liquid crystal display during an image selection of the album creation process according to the embodiment.

When the album creation function is selected by the operator and the album creation process is started, in S101 the CPU 21 reads out image files stored in the image file temporary storage area 23a and displays a list of images based on the image files on a left screen 41a of the LCD 41. FIG. 8A shows the display screen of the LCD 41 at the time of execution of S101.

As described above, the LCD 41 is composed of the horizontally-arranged two LCD panels. The two panels constitute a left screen 41a and a right screen 41b, respectively, as shown in FIG. 8A, and can display different contents. For example, "images are displayed on left screen 41a" means that images are displayed on the left side panel (left side panel in FIGS. 8A through 11D) of the two LCD panels, and "images are displayed on right screen 41b" means that images are displayed on the right side panel (right side panel in FIGS. 8A through 11D) of the two LCD panels.

Upon execution of S101, a plurality of images based on the image files read out from the image file temporary storage area 23a are displayed on the left screen 41a of the LCD 41. The plurality of images are each surrounded by a rectangular frame. The operator selects one desired image by touching the corresponding frame area. The display state on the left screen 41a of the LCD 41 shown in FIG. 8A is referred to as "thumbnail screen".

In this embodiment, an image A of lighthouse, an image B of house, and an image C of church are displayed on the thumbnail screen. The right screen 41b serves as a work screen. In the state of S101, nothing is displayed on the work screen.

In S102, the CPU determines whether or not any one of images displayed on the left screen 41a of the LCD 41 has been touched by the operator. When determining that the image has been touched (S102:YES), in S103 the CPU 21 displays the touched image on the right screen 41b on the LCD 41. On the other hand, when determining that the image has not been touched (S102:NO), the CPU 21 does not execute the process of S103, and advances to S104.

Figure 8B:
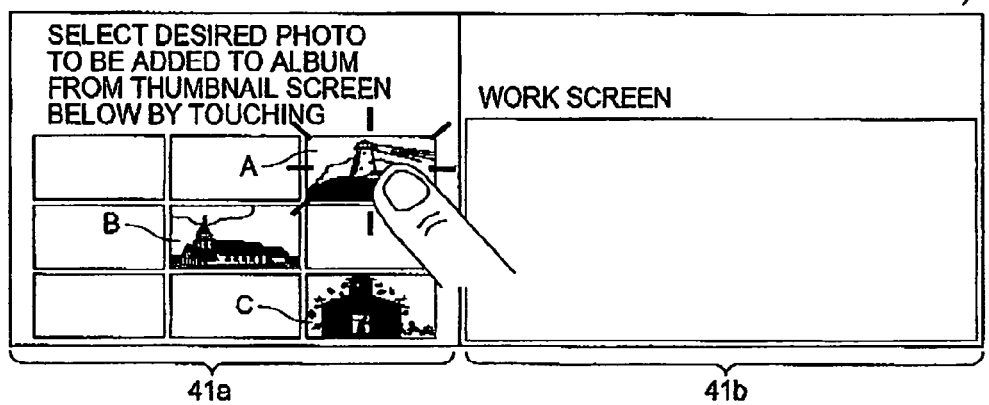

FIG. 8B shows a state where the image A on the thumbnail screen is touched by the operator. This touch of the operator on the screen of the LCD 41 causes the determination at S102 to result in YES. If frames (frames other than those displaying images A, B, and C) displaying no image are touched, the determination at S102 results in NO.

Figure 8C:
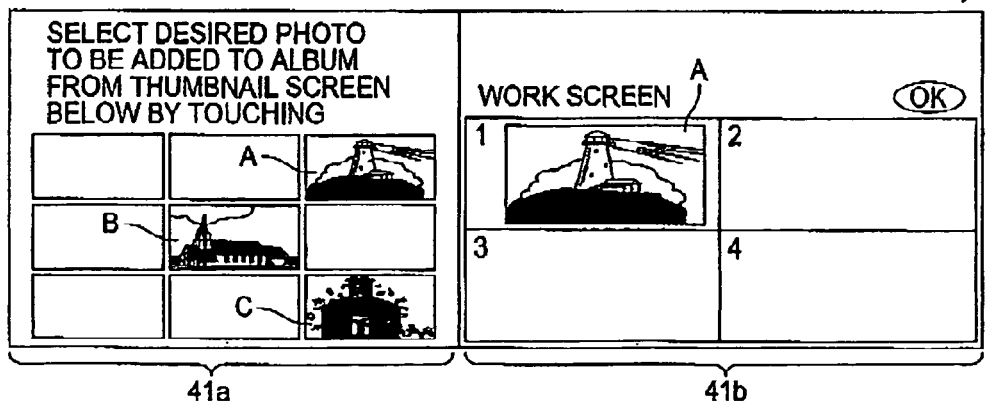

Then, when the image A has been touched by the operator, the image A is displayed on the right screen 41b of the LCD 41 in S103 as shown in FIG. 8C. When one or more images are displayed on the right screen 41b of the LCD 41, "OK" prompt is displayed at the upper right portion of the LCD 41.

At this time, partition lines are displayed on the work screen (the right screen 41b) of the LCD 41. More specifically, when one or more images are selected, horizontal and vertical partition lines are displayed to divide the right screen 41b into four areas. Although not shown, when five or more images are selected, the right screen 41b is divided into nine areas, and when ten or more images are selected, the right screen 41b is divided into sixteen areas.

In S104, the CPU 21 determines whether or not the "OK" prompt displayed at the upper right portion of the LCD 41 has been touched. When the CPU 21 determines that the "OK" prompt has not been touched (S104:NO), the flow returns to S102 where the CPU 21 determines once again whether or not the image has been touched. Thus, the operator can select the arbitrary number of images for display before touching the "OK" prompt.

Figure 8D:
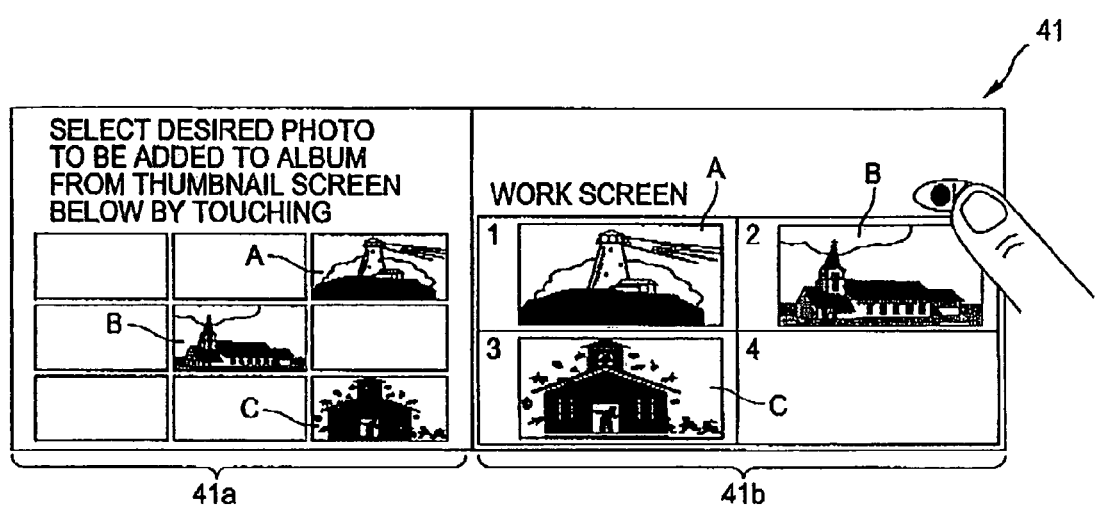

FIG. 8D shows a state where the three images A to C have been selected and displayed on the right screen 41b. In the following, a case where the three images A to C have been selected will be described.

On the other hand, when determining that the "OK" prompt has been touched by the operator (S104:YES), which means that the selection of the image by the operator has been completed, in S105 the CPU 21 reads out, from the template information storage area 22a, template information corresponding to the number of images displayed on the right screen 41b and displays a plurality of templates corresponding to the number of images on the left screen 41a of the LCD 41.

Figure 9A:
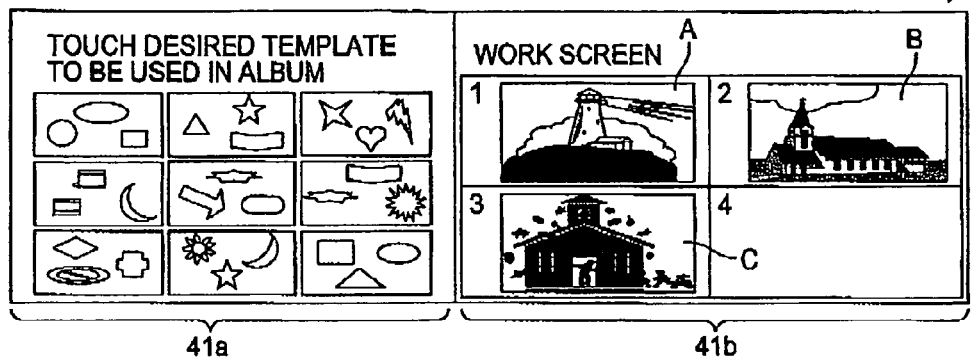
FIGS. 9A to 9C are views showing the display screens of the liquid crystal display during a template selection of the album creation process according to the embodiment.

FIG. 9A shows a state where the templates are displayed on the left screen 41a of the LCD 41 in S105. Since the three images A to C are selected by the operator, each template includes three frames for displaying the three images, as shown in FIG. 9A.

Although not shown, when the determination of S104 results in YES, i.e., the images selected by the operator are determined, image information storage areas 23b corresponding to respective selected images are allocated in the RAM 23. That is, in this embodiment, when the determination of S104 results in YES, three image information storage areas 23b are allocated in the RAM 23. At this time, as described above, drawing information corresponding to the selected images is stored, as original image data, from the image file temporary storage area 23a into the drawing information storage area 23b8.

In S106, the CPU 21 determines whether or not any one of the templates displayed on the left screen 41a of the LCD 41 has been touched. When determining that the template has not been touched (S106:NO), the CPU 21 does not execute the process of S107 and S108, and advances to S109.

On the other hand, when determining that one of the templates has been touched by the operator (S106:YES), in S107 the CPU 21 performs trimming of each image according to the position and shape defined by the touched template and stores image information corresponding to the image after trimming in the image information storage area 23b. Then, in S108 the CPU 21 displays each of the images A-C based on all information stored in each image information storage area 23b, and advances to S109.

The trimming of the image executed in S107 is process of making an outline of the image into a prescribed shape (outline) that has been defined by the template. Further, at this time, information indicating the position (e.g., coordinate on the right screen 41b) of the image set by the template is stored in the position information storage area 23b1, information indicating the shape set by the template is stored in the layout information storage area 23b2, attributes added or applied to the image are stored in the correction information storage area 23b3, size information storage area 23b4, color information storage area 23b5, brightness information storage area 23b6, and resolution information storage area 23b7, respectively.

Figure 9B:
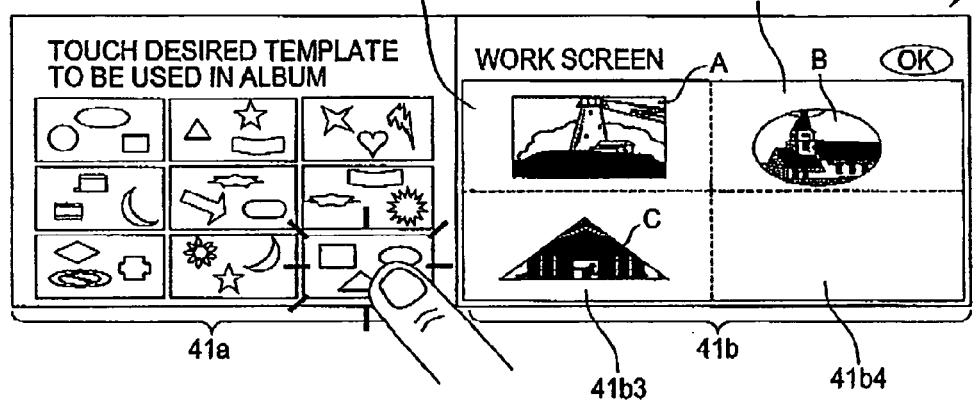

As shown in FIG. 9B, when the one of the templates is selected by the operator, the images are trimmed according to the selected template and displayed at the positions defined by the template. In this embodiment, the image A is trimmed into a rectangular shape and is displayed at the upper left portion of the right screen 41b, image B is trimmed into a circular shape and is displayed at the upper right portion, and image C is trimmed into a triangular shape and is displayed at the lower left portion.

Further, when the one of the templates is selected by the operator, the right screen 41b of the LCD 41 is divided into a plurality of areas according to the template (according to the number of images and positions of the images). As shown in FIG. 9B, the right screen 41b is divided into four areas: selection area 41b1 associated with the image A; selection area 41b2 associated with the image B, selection area 41b3 associated with the image C, and selection area 41b4 in which no image is displayed.

Thus, when the operator touches any one of the selection areas 41b1 to 41b4, a signal corresponding to the touched selection area is output. The CPU 21 receives the output signal and recognizes the touched selection area. This allows the CPU 21 to recognize the image associated with the touched selection area and confirm that the image has been selected. The selection area 41b4, in which no image is displayed, is an invalid area, and no image is selected even when being touched.

In S109, the CPU 21 determines whether or not the "OK" prompt displayed at the upper right portion of the LCD 41 has been touched. When the CPU 21 determines that the "OK" prompt has not been touched (S109:NO), the flow returns to S106 where the CPU 21 determines once again whether or not any one of the templates displayed on the left screen 41a has been touched. Thus, the operator can select a plurality of types of templates while confirming the trimming result displayed on the right screen 41b of the LCD 41, thereby selectively determining a desired template.

On the other hand, when determining in S109 that the "OK" prompt has been touched by the operator (S109:YES), in S110 the CPU 21 executes edit process for editing the images and template selected by the operator, and this flow is ended.

Figure 9C:
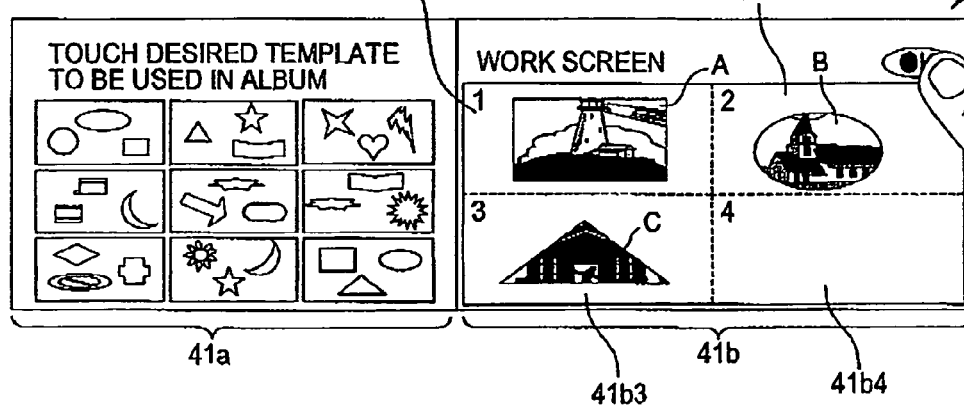

FIG. 9C shows a state where the "OK" prompt displayed at the upper right portion of the right screen 41b of the LCD 41 is touched after the selection of the template. This operation as shown in FIG. 9C causes the determination at S109 to result in YES.

Figure 4:
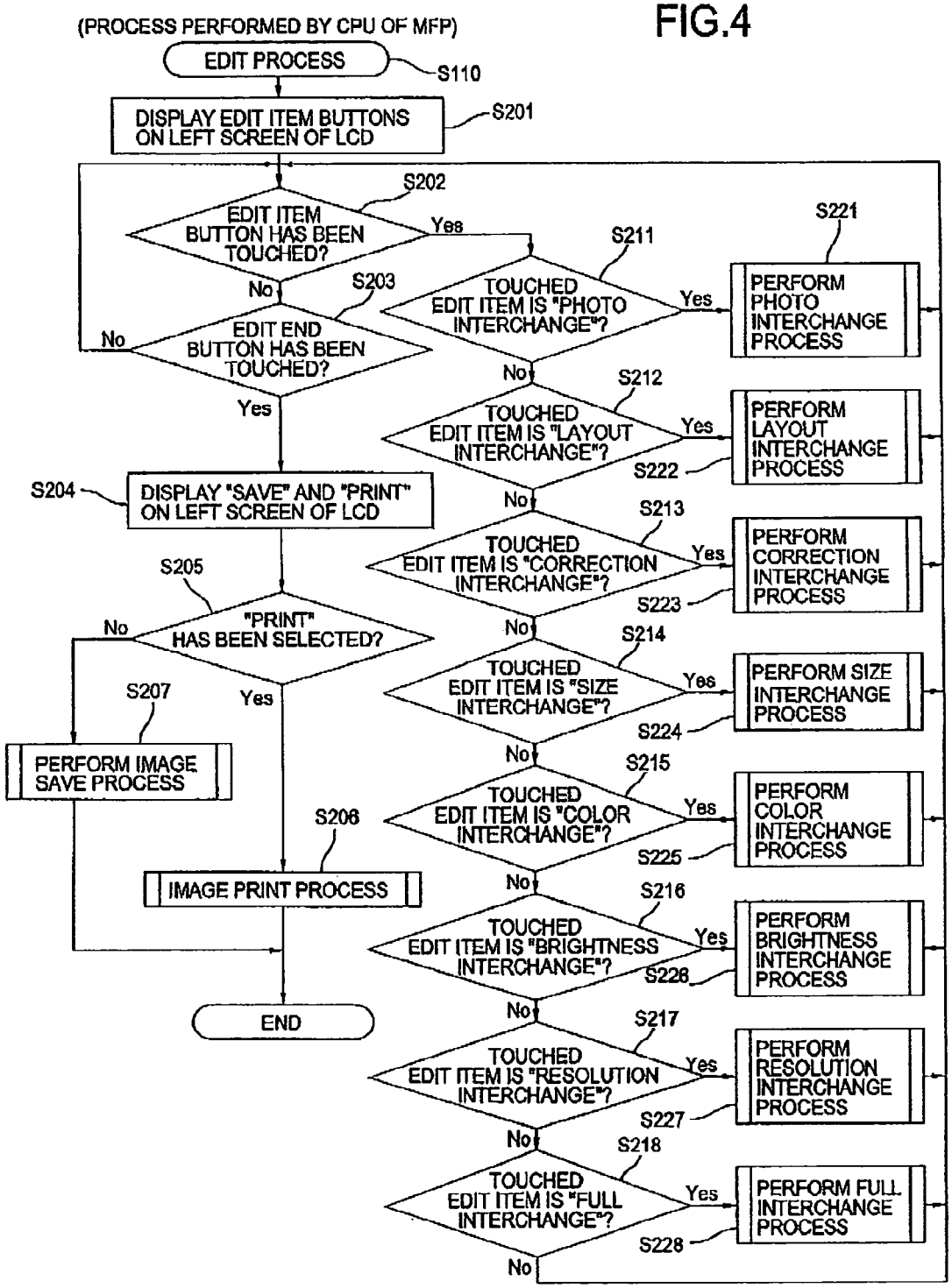
FIG. 4 is a flowchart showing edit process executed by the CPU of the MFP according to the embodiment.

FIG. 4 is a flowchart showing the edit process executed by the CPU 21 of the MFP 1. The edit process is started by the process of S110 in the album creation process.

When the edit process is started, in S201 the CPU 21 displays edit items on the left screen 41a of the LCD 41. In this embodiment, the edit items include "photo interchange", "layout interchange", "correction interchange", "size interchange", "color interchange", "brightness interchange", "resolution interchange", and "full interchange". The "photo interchange" interchanges the positions of the arranged images. The "layout interchange" interchanges the shapes in the template. The "correction interchange" interchanges the corrections applied to the images. The "size interchange" interchanges the sizes of the images. The "color interchange" interchanges the colors added to the images. The "brightness interchange" interchanges the brightnesses of the images. The "resolution interchange" interchanges the resolutions of the images. The "full interchange" fully interchanges the above elements.

As shown in FIG. 10A, eight edit item buttons corresponding to the abovementioned "photo interchange", "layout interchange", "correction interchange", "size interchange", "color interchange", "brightness interchange", "resolution interchange", and "full interchange", and an "edit end" button are displayed on the left screen 41a of the LCD 41. When any one of the eight-item buttons is touched, the touched item is selected as an edit item to be applied to the images. When the "edit end" button is touched, the edit process is ended.

In S202, the CPU 21 determines whether or not any one of the eight edit item buttons has been touched (S202). When determining that the edit item button has not been touched (S202:NO), in S203 the CPU 21 determines whether or not the "edit end" button has been touched.

When the CPU 21 determines in S203 that the "edit end" button has not been touched (S203:NO), the flow returns to S202, and the CPU 21 repeats S202 and S203 until the edit-item button or "edit end" button is touched by the operator.

FIG. 10B shows a state where the "photo interchange" button is touched as the edit item by the operator. As shown in FIG. 10B, by depressing the button (area) on which the edit item is displayed, the operator can select one edit item.

As shown in FIG. 10C, when one of the edit items is touched by the operator, the touched edit item is lighted so as to show that the touched edit item has been selected. In this embodiment, the lighting (selected) state of the selected edit item is retained until the edit of the selected edit item is completed. When the one of the edit items is selected, a massage "Select image 1" is displayed at the upper right portion of the LCD 41 so as to indicate the subsequent operation to the operator (see FIG. 11A).

On the other hand, when determining in S203 that the "edit end" button has been touched (S203:YES), the CPU 21 displays "print" and "save" on the left screen 41a of the LCD 41 so as to allow the operator to end the edit process. Thus, the operator can print or save the edited image.

In S205, the CPU 21 determines whether or not the "print" has been touched by the operator. When determining that the "print" has been touched by the operator (S205:YES), in S206 the CPU 21 executes image print process, and this flow is ended. When determining that the "save" has been touched (S205:NO), in S207 the CPU 21 executes image save process, and this flow is ended.

The image print process of S206 is for instructing the printer 2 to perform printing the display screen currently displayed on the right screen 41b of the LCD 41. The image save process of S207 is for storing and saving information stored in the in a memory area of the RAM 23 other than the image file temporary storage area 23a and the image information storage area 23b. Alternatively, the information stored in the image information storage area 23b may be stored directly in a memory card in the image save process. Further, both the image printing process and image save process may be selected at a time.

On the other hand, when determining in S202 that any one of the edit items has been touched (S202:YES), the CPU 21 determines whether the touched edit item is "photo interchange" (S211), layout interchange (S212), correction interchange (S213), size interchange (S214), color interchange (S215), brightness interchange (S216), resolution interchange (S217), or full interchange (S218).

When determining that the edit item touched by the operator is "photo interchange" (S211:YES), in S221 the CPU 21 performs a photo interchange process. When determining that the edit item touched by the operator is "layout interchange" (S211:NO and S212:YES), in S222 the CPU 21 performs a layout interchange process. When determining that the edit item touched by the operator is "correction interchange" (S211:NO, S212:NO, and YES:S213), in S223 the CPU 21 performs a correction interchange process. When determining that the edit item touched by the operator is "size interchange" (S211:NO, S212:NO, S213:NO, and S214:YES), in S224 the CPU 21 performs a size interchange process. When determining that the edit item touched by the operator is "color interchange" (S211:NO, S212:NO, S213:NO, S214:NO, and S215:YES), in S225 the CPU 21 performs a color interchange process. When determining that the edit item touched by the operator is "brightness interchange" (S211:NO, S212:NO, S213:NO, S214:NO, S215:NO, and S216:YES), in S226 the CPU 21 performs a brightness interchange process. When determining that the edit item touched by the operator is "resolution interchange" (S211:NO, S212:NO, S213:NO, S214:NO, S215:NO, S216:NO, and S217:YES), in S227 the CPU 21 performs a resolution interchange process. When determining that the edit item touched by the operator is "full interchange" (S211:NO, S212:NO, S213:NO, S214:NO, S215:NO, S216:NO, S217:NO, and S218:YES), in S228 the CPU 21 performs full interchange process. After performing the processes S221 to S228, the CPU 21 returns to S202.

Also when the CPU 21 determines "NO" in any of steps S211 to S218 after determining in S202 that any one of the edit items has been touched by the operator, the flow returns to S202. In this case, since the CPU 21 has determined that the any one of the edit items has been touched, the processes of any of steps S211 to S218 are repeated until the process corresponding to any edit item is performed.

Figure 5A:
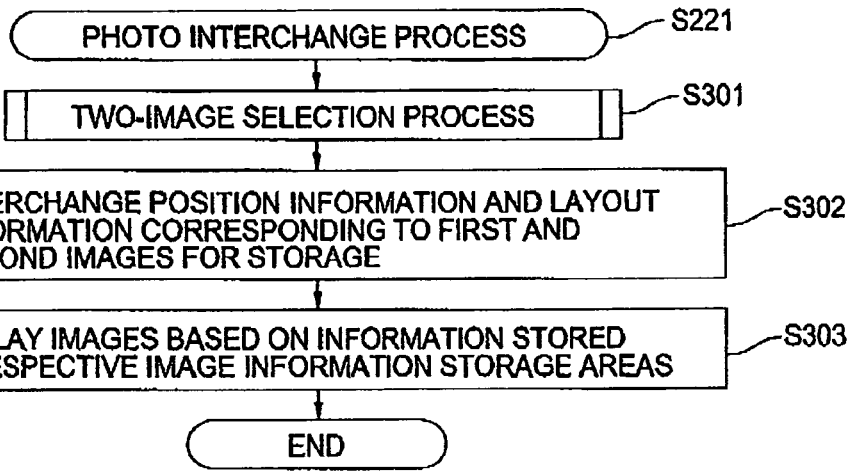
Figure 5B:
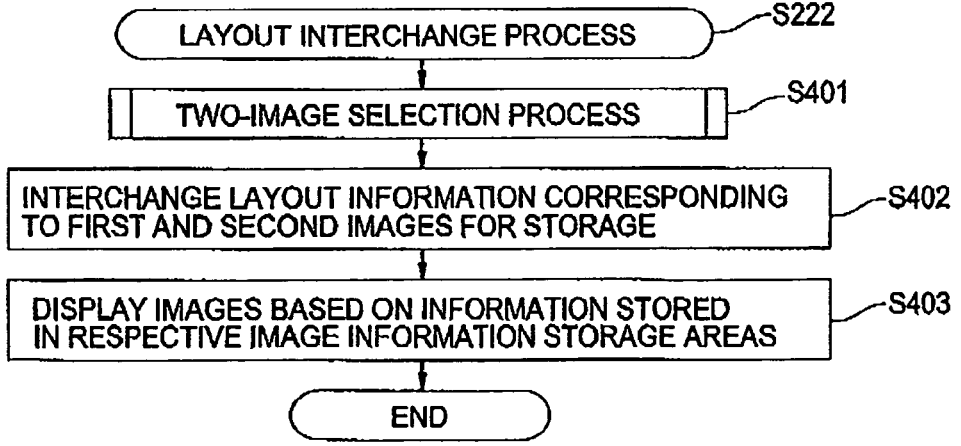
Figure 7:
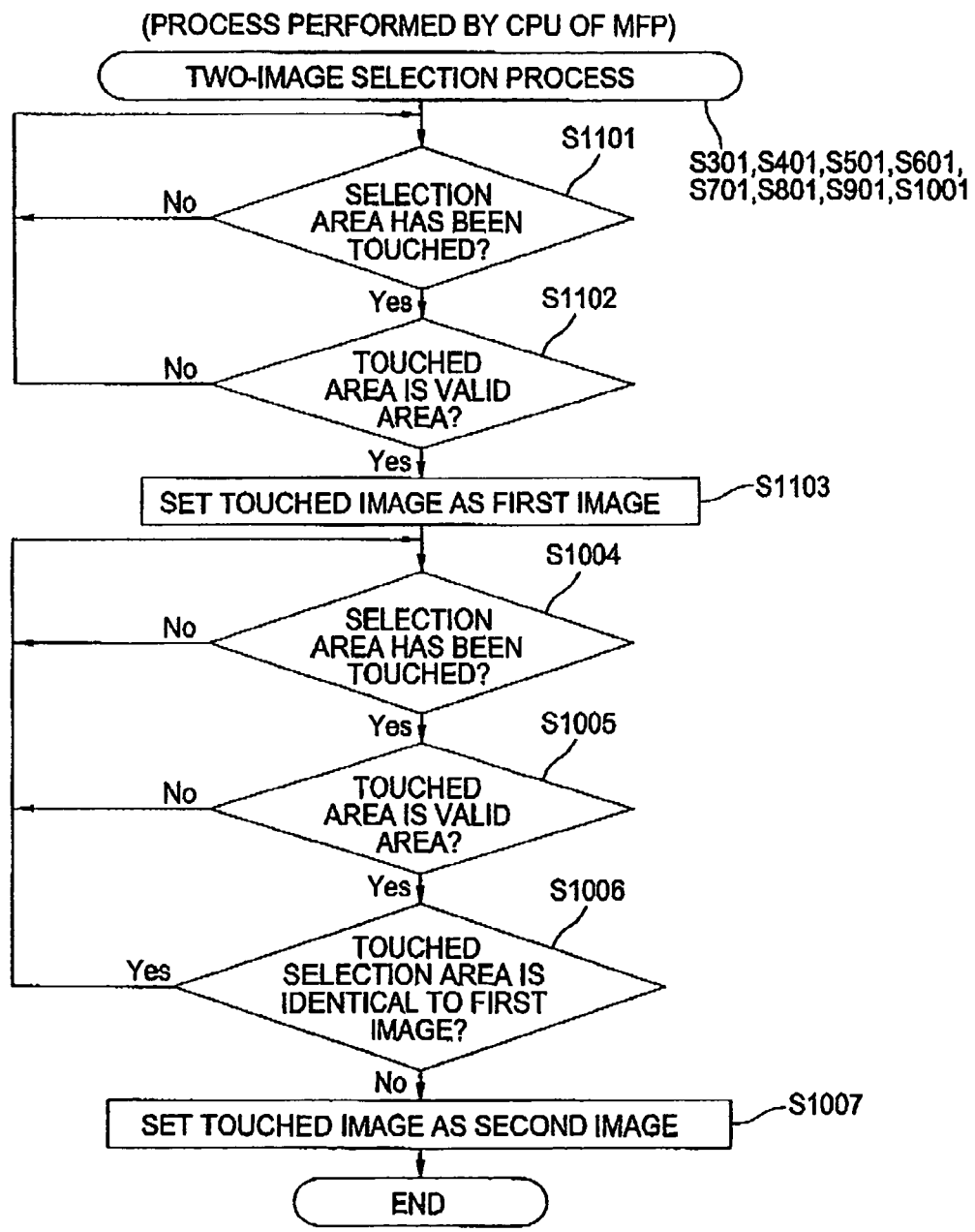
FIG. 7 is a flowchart showing two image-selection process executed by the CPU of the MFP according to the embodiment.

Here, with reference to FIGS. 5A through 7, respective interchange process of S221 to S228 will be described. FIGS. 5A through 5D are flowcharts each showing the interchange process executed by the CPU 21 of the MFP 1. FIG. 5A shows the photo interchange process, FIG. 5B shows the layout interchange process, FIG. 5C shows the correction interchange process, and FIG. 5D shows the size interchange process. FIGS. 6A to 6D are also flowcharts each showing interchange process executed by the CPU 21 of the MFP 1. FIG. 6A shows the color interchange process, FIG. 6B shows the brightness interchange process, FIG. 6C shows the resolution interchange process, and FIG. 6D shows the full interchange process. FIG. 7 is a flowchart showing two image-selection process executed by the CPU 21 of the MFP 1.

First, with reference to FIG. 5A, the photo interchange process will be described. When the photo interchange process is started by the process of S221 in the edit process, in S301 the CPU 21 executes two-image selection process. The two-image selection process will be described with reference to FIG. 7.

As shown in FIG. 7, when the two-image selection process is started, in S1101 the CPU 21 determines whether or not any one of the selection areas 41b1 to 41b4 displayed on the right screen 41b of the LCD 41 has been touched. When determining that the selection area has not been touched (S1101:NO), the CPU 21 waits until any one of the selection areas 41b1 to 41b4 is touched.

On the other hand, when determining in S1101 that any one of the selection areas 41b1 to 41b4 has been touched by the operator (S1101:YES), in S1102 the CPU 21 determines whether or not the touched selection area is a valid area. In this embodiment, the selection areas 41b1 to 41b3 that images are displayed and associated are valid areas, while the selection area 41b4 is invalid area.

When the CPU 21 determines in S1102 that the selection area that has been touched by the operator is not valid area (S1102:NO), the flow returns to S1101 and the CPU 21 repeats S1101 and S1102 until the valid area is touched.

As shown in FIG. 11A, in this embodiment, a case where the selection area 41b2 is touched by the operator as a first image will be described.

When determining that the selection area 41b2 (valid area) has been touched (S1102:YES), the CPU 21 sets the image B displayed in the touched selection area 41b2 as the first image (S1103), and the flow advances to S1104. When the process of S1103 is executed to set the first image, a message "select image 2" is displayed on the upper right portion of the LCD 41 as shown in FIG. 11B, allowing the operator to recognize that the first image has been selected properly.

In S1104, the CPU 21 determines whether or not any one of the selection areas 41b1 to 41b4 displayed on the right screen 41b of the LCD 41 has been touched once again. When determining that the selection area has not been touched (S1104:NO), the CPU 21 waits until any one of the selection areas 41b1 to 41b4 is touched.

On the other hand, when determining in S1104 that any one of the selection areas 41b1 to 41b4 has been touched by the operator (S1104:YES), in S1105 the CPU 21 determines whether or not the touched selection area is a valid area.

When the CPU 21 determines in S1105 that the selection area that has been touched by the operator is not valid area (S1105:NO), the flow returns to S1104 and the CPU 21 repeats S1104 and S1105 until the valid area (any one of the selection areas 41b1 to 41b3) is touched.

On the other hand, when determining in S1105 that the touched area is a valid area (any one of the selection areas 41b1 to 41b3) (S1105:YES), in S1106 the CPU 21 determines whether or not the touched area is identical to the first image. That is, in S1106, the CPU 21 determines whether or not the touched area is the selection area 41b2.

When the CPU 21 determines in S1106 that the touched area in S1104 is identical to the first image, i.e., selection area 41b2 (S1106:YES), the flow returns to S1104 and the CPU 21 repeats S1104 to S1106 until the selection area 41b1 or 41b3 associated with a different image from the image B is touched.

Thus, when the operator has erroneously touched the same selection area in succession (S1101 and S1104), the second and subsequent touch operation is determined to be invalid operation (invalidation unit). If the same image is selected in succession (S1101 and S1104), the same information are interchanged with each other, so that no change occurs visually. In this case, the operator recognizes that the operator has not completed the selection of the second image, although the photo interchange process has actually been completed, and touches any one of the selection areas 41b1 to 41b3. However, since the photo interchange process has been completed, the selection of the image cannot be made with the result that the operator needs to start operating for the photo interchange process from the beginning again, thereby deteriorating usability. In this embodiment, when the image identical to the first image is selected as the second image, the selection operation for the second image is made invalid operation, thereby avoiding the deterioration of usability.

When determining in S1106 that the touched selection area is not identical to the first image, that is, the touched selection area is one of the selection areas 41b1 and 41b3 (S1106:NO), the CPU sets an image associated with the touched selection area as the second image (S1107), and this flow is ended.

As shown in FIG. 11B, in this embodiment, a case where the selection area 41b3 is touched by the operator as the second image will be described.

Returning to FIG. 5A, the process of S302 and subsequent process will be described. When two images (first and second images) are selected in the two-image selection process of S301, in S302 the CPU 21 interchanges the position information, corresponding to the first image (image B), stored in the corresponding position information storage area 23b1 and the position information, corresponding to the second image (image C), stored in the corresponding position information storage area 23b1 with each other, and stores the interchanged position information in each position information storage area 23b1. Then, the CPU 21 creates images based on the information stored in the image information storage areas 23b corresponding respectively to the first and second images, and in S303 displays the created images on the LCD 41, and this flow is ended.

In the process of S303, the images are processed based on the information stored in the image information storage areas 23b and resultant images are displayed on the LCD 41, respectively. That is, the position information is changed to change the positions at which the images are displayed. As a result, the images whose shapes (outlines) have been changed are displayed at the positions corresponding to the changed position information.

FIG. 11C shows a state where the positions of the image B and image C have been interchanged with each other after the process of S303. As shown in FIG. 11C, the positions of the images B and C have been interchanged with each other. The layout (position of each shape) of the template is not changed, so that the image C is trimmed into a circular shape and image B is trimmed into a triangular shape. As described above, the positions of the images can be interchanged with each other only with two operations: operation for selecting the image B by touching and operation for selecting the image C by touching.

The layout interchange process, correction interchange process, size interchange process, color interchange process, brightness interchange process, resolution interchange process, and full interchange process will briefly be described below. Only for the layout interchange process, description will be made with reference to FIG. 11D. When the layout interchange process shown in FIG. 5B is started, in S401 the CPU 21 executes the two-image selection process shown in FIG. 7, in S402 interchanges the layout information, corresponding to the first image, stored in the corresponding layout information storage area 23b2 and layout information, corresponding to the second image, stored in the corresponding layout information storage area 23b2 with each other, and stores the interchanged layout information in each layout information storage area 23b2. Then, the CPU 21 creates images based on information stored in the image information storage areas 23b corresponding respectively to the first and second images and in S403 displays the created images on the LCD 41, and this flow is ended.

Figure 11D:
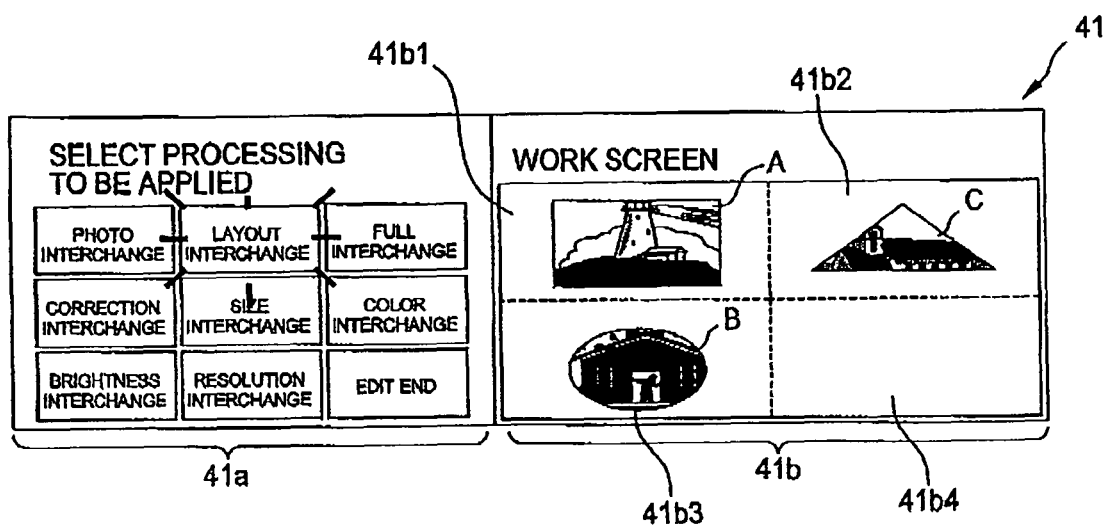

That is, in the layout interchange process, the CPU 21 does not interchange the positions of the images but interchanges only the shapes in the template. Therefore, the CPU 21 interchanges only the layout information corresponding to the first and second images and stores the interchanged layout information in each layout information storage area 23b2. FIG. 11D shows a result of the layout interchange process. As can be seen from FIG. 11D, the positions of the images B and C have not been changed relative to the positions shown in FIG. 11B, but only the layout of the template has been changed.

When the correction interchange process shown in FIG. 5C is started, in S501 the CPU 21 executes the two-image selection process shown in FIG. 7, interchanges the correction information, corresponding to the first image, stored in the corresponding correction information storage area 23b3 and correction information, corresponding to the second image, stored in the corresponding correction information storage area 23b3 with each other, and stores the interchanged correction information in each correction information storage area 23b3. Then, the CPU 21 creates images based on information stored in the image information storage areas 23b corresponding respectively to the first and second images and in S503 displays the created images on the LCD 41, and this flow is ended.

That is, in the correction interchange process, the CPU 21 does not interchange the positions and shapes of the images but interchanges only the corrections (edge correction or feathering correction) applied to the images. Therefore, the CPU 21 interchanges only the correction information corresponding to the first and second images and stores the interchanged correction information in each correction information storage area 23b3.

When the size interchange process shown in FIG. 5D is started, in S601 the CPU 21 executes the two-image selection process shown in FIG. 7, in S602 interchanges the size information, corresponding to the first image, stored in the corresponding size information storage area 23b4 and size information, corresponding to the second image, stored in the corresponding size information storage area 23b4 with each other, and stores the interchanged size information in each size information storage area 23b4. Then, the CPU 21 creates images based on information stored in the image information storage areas 23b corresponding respectively to the first and second images and in S603 displays the created images on the LCD 41, and this flow is ended.

That is, in the size interchange process, the CPU 21 does not interchange the positions of the images but interchanges only the sizes of the images. Therefore, the CPU 21 interchanges only the size information corresponding to the first and second images and stores the interchanged size information in each size information storage area 23b4.

When the color interchange process shown in FIG. 6A is started, in S701 the CPU 21 executes the two-image selection process shown in FIG. 7, in S702 interchanges the color information, corresponding to the first image, stored in the corresponding color information storage area 23b5 and color information, corresponding to the second image, stored in the corresponding color information storage area 23b5 with each other, and stores the interchanged color information in each color information storage area 23b5. Then, the CPU 21 creates images based on information stored in the image information storage areas 23b corresponding respectively to the first and second images and in S703 displays the created images on the LCD 41, and this flow is ended.

That is, in the color interchange process, the CPU 21 does not interchange the positions and shapes of the images but interchanges only the colors (color combination) set to the images. Therefore, the CPU 21 interchanges only the color information corresponding to the first and second images and stores the interchanged color information in each color information storage area 23b5.

When the brightness interchange process shown in FIG. 6B is started, in S801 the CPU 21 executes the two-image selection process shown in FIG. 7, in S802 interchanges the brightness information, corresponding to the first image, stored in the corresponding brightness information storage area 23b6 and brightness information, corresponding to the second image, stored in the corresponding brightness information storage area 23b6 with each other, and stores the interchanged brightness information in each brightness information storage area 23b6. Then, the CPU 21 creates images based on information stored in the image information storage areas 23b corresponding respectively to the first and second images and in S803 displays the created images on the LCD 41, and this flow is ended.

That is, in the brightness interchange process, the CPU 21 does not interchange the positions and shapes of the images but interchanges only the brightnesses set to the images. Therefore, the CPU 21 interchanges only the brightness information corresponding to the first and second images and stores the interchanged brightness information in each brightness information storage area 23b6.

When the resolution interchange process shown in FIG. 6C is started, in S901 the CPU 21 executes the two-image selection process shown in FIG. 7, in S902 interchanges the resolution information, corresponding to the first image, stored in the corresponding resolution information storage area 23b7 and resolution information, corresponding to the second image, stored in the corresponding resolution information storage area 23b7 with each other, and stores the interchanged resolution information in each resolution information storage area 23b7. Then, the CPU 21 creates images based on information stored in the image information storage areas 23b corresponding respectively to the first and second images and in S903 displays the created images on the LCD 41, and this flow is ended.

That is, in the resolution interchange process, the CPU 21 does not interchange the positions and shapes of the images but interchanges only the resolutions (fineness) set to the images. Therefore, the CPU 21 interchanges only the resolution information corresponding to the first and second images and stores the interchanged resolution information in each resolution information storage area 23b7.

When the full interchange process shown in FIG. 6D is started, in S1001 the CPU 21 executes the two-image selection process shown in FIG. 7, in S1002 interchanges all the information, corresponding to the first image, except for the drawing information and all the information, corresponding to the second image, except for the drawing information with each other, and stores all the information except for the drawing information in each image information storage area 23b. Then, the CPU 21 creates images based on information stored in the image information storage areas 23b corresponding respectively to the first and second images and in S1003 displays the created images on the LCD 41, and this flow is ended.

The reason that the drawing information are not interchanged is that the drawing information is image data for displaying an image on the LCD 41 and serves as original image data to be processed based on the information stored in the storage areas 23b2 to 23b7.

Further, as described above, the process of S202 and S203 are repeatedly executed until the edit item or "edit end" button is touched, so that a plurality of edit items can be applied to the same image.

As described above, in the photo interchange process, when two images are selected from the images displayed on the right screen 41b of the LCD 41, the position information of the two images indicating the positions at which the two images are displayed respectively are interchanged to be stored in the respective image information storage areas 23b1. Then, based on a combination of the interchanged position information and drawing information stored in the respective drawing information storage areas 23b8, changed images are displayed on the right screen 41b of the LCD 41. Thus, the operator can interchange the positions of the images only by a simple operation of touching the two images displayed on the right screen 41b of the LCD 41.

Further, in the layout interchange process, correction interchange process, size interchange process, color interchange process, brightness interchange process, and resolution interchange process, when two images are selected from the images displayed on the right screen 41b of the LCD 41, respective information (attributes) corresponding to the selected interchange process are interchanged between the two images to be stored in the respective storage areas 23b2 to 23b7. Then, based on a combination of the interchanged information and drawing information, the display modes (attributes) of the two images are interchanged and displayed on the right screen 41b of the LCD 41. Thus, the operator can interchange the attributes of the images only by a simple operation of touching the two images displayed on the right screen 41b of the LCD 41.

Further, in the full interchange process, when two images are selected from the images displayed on the right screen 41b of the LCD 41, respective information stored in the storage areas 23b1 to 23b7 corresponding to the selected images are interchanged. Then, based on a combination of the interchanged information and drawing information, the images are displayed. Thus, the operator can interchange not only the positions but also all the attributes of the images only by a simple operation of touching the two images displayed on the right screen 41b of the LCD 41.

Further, since the LCD 41 of the MFP 1 is constituted by a touch panel, positions or attributes of the images displayed on the right screen 41b of the LCD 41 can be interchanged more easily. Thus, the touch panel can improve the operability of the MFP 1.

The MFP 1 is configured to perform copy operation, printer operation, and facsimile operation. The above operations are often executed in parallel to image process. In the copy operation, the scanner 3 is controlled according to a control program stored in the ROM 22. In the printer operation, a recording head provided in the printer 2 is controlled according to the control program stored in the ROM 22. In the facsimile operation, received data are sequentially stored. In general, MFPs are designed to perform the copy operation, printer operation, and facsimile operation in priority to image process. Therefore, when a control for the copy operation, printer operation, or facsimile operation (control for corresponding mechanical part) is performed, the required amount of memory for performing the control is preferentially ensured in the RAM 23, so that the amount of memory that can be allocated to other process is reduced (compressed). As a result, the required amount of memory for performing normal album creation process cannot often be ensured in the RAM 23.

Therefore, when an image is created for display while a drag-and-drop operation is used to move the image, the required amount of memory for this operation cannot be ensured in the RAM 23 with result that the image cannot smoothly be moved on the display screen.

However, in this embodiment, the interchange of the positions of images or interchange of the attributes of images can be carried out only by a simple operation of touching two images. Thus, even in the case where an amount of memory (memory area) that can be ensured in the RAM 23 for the image process is restricted, smooth control for image display can be achieved. That is, to carry out the interchange of the positions or attributes of images only by touching the two images is a suitable technique to the MFP 1.

Although the present invention has been described with reference to the preferred embodiment, the present invention is not limited to the above embodiment and those skilled in the art can infer that a variety of modifications and changes may be made without departing from the scope of the present invention.

For example, in the full interchange process of the above embodiment, the drawing information stored in the drawing information storage areas 23b8 are not interchanged but information stored in the storage areas 23b1 to 23b7 are interchanged for storage. Alternatively, however, information stored in the storage areas 23b1 to 23b7 may not be interchanged but the drawing information stored in the drawing information storage areas 23b8 may be interchanged for storage. That is, it is only necessary to interchange one of the drawing information and other information between two images since it is important that the positions or display modes (attributes) of the images touched by the operator are interchanged.

Further, in the above embodiment, the LCD 41 is constituted by a touch panel. Alternatively, however, a cursor may be displayed on the LCD 41 and the operation key 40 is used to move the cursor so as to determine the process of image. Further, the type of the touch panel need not be particularly limited. For example, the touch panel may be of the type that detects a pressure to the touch panel, a contact with the touch panel, or an approach of a finger or indicator.

Further, although the positions or attributes are interchanged between two images in the above embodiment, the interchange process may be made among three or more images. In this case, a rule is preferably defined in which, for example, serial numbers are assigned to the selected images and, based on the order of the serial numbers, information are interchanged step by step.

Further, although the album creation process in which the positions or attributes of the images are interchanged is executed in the MFP 1 in the above embodiment, the album creation process may be executed in any type of apparatus such as a personal computer as long as the apparatus is provided with a processing unit that can execute a program and a display unit that can display an image.

Further, although one of the following interchange process: photo interchange, layout interchange, correction interchange, size interchange, color interchange, brightness interchange, and resolution interchange or full interchange that interchanges all of the elements corresponding to the above interchanging process is executed in the above embodiment, a combination of the interchange process may arbitrarily selected.

What is claimed is:

1. An image processing device comprising:
   a display configured to display a plurality of images;
   a storage unit configured to store a plurality of pieces of image information and a plurality of pieces of position information corresponding to respective ones of the plurality of images individually, each of the plurality of pieces of position information indicating a position where each image is displayed on the display, the storage unit being configured to correlate the plurality of pieces of image information with respective ones of the plurality of pieces of position information individually, the plurality of images being to be displayed on the display based on the plurality of pieces of image information and the plurality of pieces of position information, respectively;
   an image selection unit configured to select at least a first image and a second image from the plurality of images, the first image including first image information and first position information, the second image including second image information and second position information;
   an information interchange unit configured to interchange the first image information of the first image with the second image information of the second image, or to interchange the first position information of the first image with the second position information of the second image, the storage unit being configured to store and correlate the first image information and the second position information, and store and correlate the second image information and the first position information; and
   a display controller configured to control the display to display one image based on the first image information and the second position information, and another image based on the second image information and the first position information;
   wherein the information interchange unit, the storage unit, and the display controller are configured such that, after the image selection unit selects the first image and the second image, the information interchange unit interchanges, automatically, the first image information of the first image with the second image information of the second image, or interchanges, automatically, the first position information of the first image with the second position information of the second image, the storage unit stores and correlates the first image information and the second position information, and stores and correlates the second image information and the first position information, and the display controller controls, automatically, the display to display the one image based on the first image information and the second position information, and the another image based on the second image information and the first position information.

2. The image processing device according to claim 1, further comprising an instruction receiving unit configured to receive an interchange instruction for interchanging display positions of images among the plurality of images displayed on the display,
   wherein the image selection unit is configured to select at least the first image and the second image from the plurality of images after the instruction receiving unit receives the interchange instruction,
   wherein the information interchange unit is configured to interchange, if the image selection unit selects the second image after selecting the first image, the first image information of the first image with the second image information of the second image, or to interchange, if the image selection unit selects the second image after selecting the first image, the first position information of the first image with the second position information of the second image.

3. The image processing device according to claim 2, further comprising a setting unit configured to set one selected image, as the first image, that is selected from the plurality of images by the image selection unit, and set another selected image different from the one selected image, as the second image, that is selected from the plurality of images by the image selection unit after setting the one selected image as the first image, the setting unit being configured to fail to set the one selected image, as the second image, if the image selection unit selects the one selected image in succession after the image selection unit has selected the one selected image.

4. The image processing device according to claim 3, wherein the setting unit is configured to revoke an image selecting operation in which the image selection unit selects the one selected image in succession after the image selection unit has selected the one selected image.

5. The image processing device according to claim 2, wherein the storage unit is configured to store attribute information in association with each of the plurality of pieces of image information, the attribute information being to be used for changing a display state of the image, the first image including first attribute information, the second image including second attribute information;
   wherein the information interchange unit is configured to interchange, if the image selection unit selects the second image after selecting the first image, the first image information of the first image with the second image information of the second image, or to interchange the first position information and first attribute information of the first image with the second position information and the second attribute information of the second image, respectively, the storage unit being configured to store and correlate the first image information, the second position information and the second attribute information, and to store and correlate the second image information, the first position information and the first attribute information; and
   wherein the display controller is configured to control the display to display one image based on the first image information, the second position information and the second attribute information, and another image based on the second image information, the first position information and the first attribute information.

6. The image processing device according to claim 2, wherein the display is configured to include a plurality of user selectable areas, each of the plurality of images being displayed on each of the plurality of user selectable areas, when a user selects a user selectable area, the display outputting information indicating the user selectable area selected by the user to the image selection unit; and
   wherein the image selection unit is configured to select an image corresponding to the user selectable area when the information indicating the user selectable area is received.

7. The image processing device according to claim 2, wherein the display is configured to include a first area configured to display a plurality of original images and a second area configured to display the plurality of images, the first area being adjacent to the second area;
- wherein the display controller is configured to display the plurality of original images on the first area based on the plurality of pieces of image information;
- wherein the image selection unit is configured to select at least two images from the plurality of original images displayed on the first area;
- wherein the display controller is configured to display, on the second area, the at least two images selected by the image selection unit,
- wherein the display controller is configured to display, on the first area, processing information to be used for processing the at least two images displayed on the second area in place of the plurality of images that has been displayed on the first area by the first area display unit,
- wherein the image selection unit is configured to select at least the first image and the second image from the at least two images displayed on the second area.

8. The image processing device according to claim 7, wherein the storage unit is configured to store attribute information in association with each of the plurality of pieces of image information, the attribute information being to be used for changing a display state of the image, the first image including first attribute information, the second image including second attribute information;
- wherein the information interchange unit is configured to interchange, if the image selection unit selects the second image after selecting the first image, the first image information of the first image with the second image information of the second image, or to interchange, if the image selection unit selects the second image after selecting the first image, the first position information and first attribute information of the first image with the second position information and the second attribute information of the second image, respectively, the storage unit being configured to store and correlate the first image information, the second position information and the second attribute information, and to store and correlate the second image information, the first position information and the first attribute information; and
- wherein the display controller is configured to control the display to display one image based on the first image information, the second position information and the second attribute information, and another image based on the second image information, the first position information and the first attribute information.

9. The image processing device according to claim 7, wherein the display is configured to include a plurality of user selectable areas, each of the plurality of images being displayed on each of the plurality of user selectable areas, when a user selects a user selectable area, the display outputting information indicating the user selectable area selected by the user to the image selection unit; and
- wherein the image selection unit is configured to select an image corresponding to the user selectable area when the information indicating the user selectable area is received.

10. The image processing device according to claim 1, wherein the display is configured to include a first area configured to display a plurality of original images and a second area configured to display a plurality of images, the first area being adjacent to the second area;
- wherein the display controller is configured to display the plurality of original images on the first area based on the plurality of pieces of image information;
- wherein the image selection unit is configured to select at least two images from the plurality of original images displayed on the first area;
- wherein the display controller is configured to display, on the second area, the at least two images selected by the image selection unit in a display state corresponding to a printing state of the at least two images with respect to a recording medium,
- wherein the image selection unit is configured to select at least the first image and the second image from the at least two images displayed on the second area,
- wherein the display controller is configured to display, on the second area, one image based on the first image information and the second position information, and another image based on the second image information and the first position information.

11. The image processing device according to claim 10, further comprising a printing unit configured to print the one image and the another image based on a display state in which the one image and the another image are displayed on the second area.

12. The image processing device according to claim 10, wherein the storage unit is configured to store attribute information in association with each of the plurality of pieces of image information, the attribute information being to be used for changing a display state of the image, the first image including first attribute information, the second image including second attribute information;
- wherein the information interchange unit is configured to interchange the first image information of the first image with the second image information of the second image, or to interchange the first position information and first attribute information of the first image with the second position information and the second attribute information of the second image, respectively, the storage unit being configured to store and correlate the first image information, the second position information, and the second attribute information, and to store and correlate the second image information, the first position information, and the first attribute information; and
- wherein the display controller is configured to control the display to display one image based on the first image information, the second position information, and the second attribute information, and another image based on the second image information, the first position information, and the first attribute information.

13. The image processing device according to claim 12, wherein the information interchange unit comprises:
- a first interchange unit configured to interchange the first image information of the first image and the first attribute information in association with the first image information with the second image information of the second image and the second attribute information in association with the second image information, or interchange the first position information in association with the first image information with the second position information in association with the second image information;
- a second interchange unit configured to interchange the first image information and the second image information, or interchange the first position information and the first attribute information with the second position information and the second attribute information; and a third interchange unit configured to interchange the first image information and the first position information with the second image information and the second position information, or interchange the first attribute information and the second attribute information, the image processing device further comprising a function selection unit configured to select one of the first interchange unit, the second interchange unit, and the third interchange unit, wherein the selected one of the first interchange unit, the second interchange unit, and the third interchange unit is configured to interchange at least one of the first image information, the first position information, and the first attribute information with at least one of the second image information, the second position information, and the second attribute information.

14. The image processing device according to claim 10, further comprising:
   a determining unit configured to determine whether or not one selected image selected by the second selection unit after the second selection unit has selected another selected image is different from the another selected image; and
   a setting unit configured to set the another selected image, as the first image, that is selected from the at least two images by the second selection unit, and set the one selected image, as the second image, that is selected from the at least two images by the second selection unit if the determining unit determines that the one selected image is different from the another selected image.

15. The image processing device according to claim 10, further comprising:
   a touch panel configured to detect an input corresponding to a contact position or an adjacent position of an indicator on the display, and
   wherein the image selection unit is configured to select an image displayed on the display when the touch panel detects the input by the indicator with respect to the image displayed on the display.

16. The image processing device according to claim 1, wherein the display is configured to include a first area configured to display a plurality of templates and a second area configured to display a plurality of images, the first area being adjacent to the second area, the plurality of images being to be displayed on the second area based on the plurality of pieces of image information and the plurality of pieces of position information, respectively,
   wherein the storage unit is configured to store a plurality of pieces of template information corresponding to respective ones of the plurality of templates individually, each of the plurality of pieces of template information defining a position and shape of each of the plurality of images displayed on the second area,
   wherein the display controller is configured to display, on the first area, the plurality of templates in a selectable state based on the plurality of pieces of template information;
   wherein the image selection unit is configured to select one template from the plurality of templates displayed on the first area;
   wherein the display controller is configured to display, on the second area, a plurality of combined images by combining the plurality of images and the selected one template;
   wherein the image selection unit is configured to select at least the first image and the second image from the plurality of combined images displayed on the second area,
   wherein the display controller is configured to display, on the second area, one image based on the first image information, the second position information, and the selected one template, and another image based on the second image information, the first position information, and the selected one template.

17. The image processing device according to claim 16, further comprising a printing unit configured to print the one image and the another image based on a display state in which the one image and the another image are displayed on the second area.

18. The image processing device according to claim 16, wherein the storage unit is configure to store attribute information in association with each of the plurality of pieces of image information, the attribute information being to be used for changing a display state of the image, the first image including first attribute information, the second image including second attribute information;
   wherein the information interchange unit is configured to interchange the first image information of the first image with the second image information of the second image, or to interchange the first position information and first attribute information of the first image with the second position information and the second attribute information of the second image, respectively, the storage unit being configured to store and correlate the first image information, the second position information, and the second attribute information, and to store and correlate the second image information, the first position information, and the first attribute information; and
   wherein the display controller is configured to control the display to display one image based on the first image information, the second position information, the second attribute information, and the selected one template, and another image based on the second image information, the first position information, the first attribute information, and the selected one template.

19. The image processing device according to claim 18, wherein the information interchange unit comprises:
   a first interchange unit configured to interchange the first image information of the first image and the first attribute information in association with the first image information with the second image information of the second image and the second attribute information in association with the second image information, or interchange the first position information in association with the first image information with the second position information in association with the second image information;
   a second interchange unit configured to interchange the first image information and the second image information, or interchange the first position information and the first attribute information with the second position information and the second attribute information; and
   a third interchange unit configured to interchange the first image information and the first position information with the second image information and the second position information, or interchange the first attribute information and the second attribute information, the image processing device further comprising a function selection unit configured to select one of the first interchange unit, the second interchange unit, and the third interchange unit, wherein the selected one of the first interchange unit, the second interchange unit, and the third interchange unit is configured to interchange at least one of the first image information, the first position information, and the first attribute information with at least one of the second image information, the second position information, and the second attribute information.

20. The image processing device according to claim 16, further comprising:
a determining unit configured to determine whether or not one selected image selected by the second selection unit after the second selection unit has selected another selected image is different from the another image; and
a setting unit configured to set the another selected image, as the first image, that is selected from the at least two images by the second selection unit, and set the one selected image, as the second image, that is selected from the at least two images by the second selection unit if the determining unit determines that the one selected image is different from the another selected image.

21. The image processing device according to claim 16, further comprising:
a touch panel configured to detect an input corresponding to a contact position or an adjacent position of an indicator on the display, and
wherein the image selection unit is configured to select an image displayed on the display when the touch panel detects the input by the indicator with respect to the image displayed on the display.

22. An image processing device comprising:
a display configured to display a plurality of images;
a storage unit configured to store a plurality of pieces of image information corresponding to respective ones of the plurality of images, and attribute information corresponding to each of the plurality of pieces of image information, the attribute information being to be used for changing a display state of the image, each of the plurality of images being displayed on the display based on each of the plurality of image information and corresponding attribute information;
an image selection unit configured to select at least a first image and a second image from the plurality of images, the first image including first image information and first attribute information, the second image including second image information and second attribute information;
an information interchange unit configured to interchange the first image information of the first image with the second image information of the second image, or interchanges the first attribute information of the first image with the second attribute information of the second image, the storage unit being configured to store and correlate the first image information and the second attribute information, and store and correlate the second image information and the first attribute information; and
a display controller configured to control the display to display one image based on the first image information and the second attribute information, and another image based on the second image information and the first attribute information;
wherein the information interchange unit, the storage unit, and the display controller are configured such that, after the image selection unit selects the first image and the second image, the information interchange unit interchanges, automatically, the first image information of the first image with the second image information of the second image, or interchanges, automatically, the first attribute information of the first image with the second attribute information of the second image, the storage unit stores and correlates the first image information and the second attribute information, and stores and correlates the second image information and the first attribute information, and the display controller controls, automatically, the display to display the one image based on the first image information and the second attribute information, and the another image based on the second image information and the first attribute information.

23. The image processing device comprising according to claim 22, further comprising an instruction receiving unit configured to receive an interchange instruction for interchanging display positions of images among the plurality of images displayed on the display,
wherein the image selection unit is configured to select at least the first image and the second image from the plurality of images after the instruction receiving unit receives the interchange instruction,
wherein the information interchange unit is configured to interchange, if the image selection unit selects the second image after selecting the first image, the first image information of the first image with the second image information of the second image, or to interchange, if the image selection unit selects the second image after selecting the first image, the first attribute information of the first image with the second attribute information of the second image.

24. The image processing device according to claim 23, further comprising a setting unit configured to set one selected image, as the first image, that is selected from the plurality of images by the image selection unit, and set another selected image different from the one selected image, as the second image, that is selected from the plurality of images by the image selection unit after setting the one selected image as the first image, the setting unit being configured to fail to set the one selected image, as the second image, if the image selection unit selects the one selected image in succession after the image selection unit has selected the one selected image.

25. The image processing device according to claim 24, wherein the setting unit is configured to revoke an image selecting operation in which the image selection unit selects the one selected image in succession after the image selection unit has selected the one selected image.

26. The image processing device according to claim 23, wherein the display includes a plurality of user selectable areas, each of the plurality of images being displayed on each of the plurality of user selectable areas, when a user selects a user selectable area, the display outputting information about the user selectable area selected by the user to the image selection unit; and
wherein the image selection unit selects an image corresponding to the user selectable area when the information about the user selectable area is received.

27. The image processing device according to claim 22, wherein the display is configured to include a first area configured to display a plurality of original images and a second area configured to display a plurality of images, the first area being adjacent to the second area,
wherein the display controller is configured to display the plurality of original images on the first area based on the plurality of pieces of image information and the plurality of pieces of attribute information;

wherein the image selection unit is configured to select at least two images from the plurality of original images displayed on the first area, wherein the display controller is configured to display, on the second area, the at least two images selected by the image selection unit, the storage unit being configured to store at least two pieces of position information each indicating a position where each of the at least two images is displayed on the second area and to correlate the at least two pieces of position information with respective ones of at least two pieces of image information displayed on the second area individually, the at least two images being to be displayed on the second area based on the at least two pieces of image information and the at least two pieces of position information, wherein the display controller is configured to display, on the first area, processing information to be used for processing the at least two images displayed on the second area in place of the plurality of images that has been displayed on the first area by the first area display unit, wherein the image selection unit is configured to select at least the first image and the second image from the at least two images displayed on the second area.

28. The image processing device according to claim 27, wherein the display includes a plurality of user selectable areas, each of the plurality of images being displayed on each of the plurality of user selectable areas, when a user selects a user selectable area, the display outputting information about the user selectable area selected by the user to the image selection unit; and wherein the image selection unit selects an image corresponding to the user selectable area when the information about the user selectable area is received.

29. The image processing device according to claim 22, wherein the display is configured to include a first area configured to display a plurality of original images and a second area configured to display a plurality of images, the first area being adjacent to the second area;

wherein the display controller is configured to display the plurality of original images on the first area based on the plurality of pieces of image information and the plurality of pieces of attribute information;

wherein the image selection unit is configured to select at least two images from the plurality of original images displayed on the first area;

wherein the display controller is configured to display, on the second area, the at least two images selected by the image selection unit in a display state corresponding to a printing state of the at least two images with respect to a recording medium, the storage unit being configured to store at least two pieces of position information each indicating a position where each of the at least two images is displayed on the second area and to correlate the at least two pieces of position information with respective ones of at least two pieces of image information displayed on the second area individually, wherein the image selection unit is configured to select at least the first image and the second image from the at least two images displayed on the second area, the first image including first image information, first attribute information, and first position information, the second image including second image information, second attribute information, and second position information, wherein the information interchange unit is configured to interchange the first image information of the first image and the first position information in association with the first image information with the second image information of the second image and the second position information in association with the second image information, or interchanges the first attribute information of the first image with the second attribute information of the second image, the storage unit being configured to store and correlate the first image information and the first position information, and the second attribute information, and store and correlate the second image information, the second position information, and the first attribute information, wherein the display controller is configured to display, on the second area, one image based on the first image information, the first position information, and the second attribute information, and another image based on the second image information, the second position information, and the first attribute information.

30. The image processing device according to claim 29, further comprising a printing unit configured to print the one image and the another image based on a display state in which the one image and the another image are displayed on the second area.

31. The image processing device according to claim 29, wherein the information interchange unit comprises:

a first interchange unit configured to interchange the first image information of the first image and the first attribute information in association with the first image information with the second image information of the second image and the second attribute information in association with the second image information, or interchange the first position information in association with the first image information with the second position information in association with the second image information;

a second interchange unit configured to interchange the first image information and the second image information, or interchange the first position information and the first attribute information with the second position information and the second attribute information; and a third interchange unit configured to interchange the first image information and the first position information with the second image information and the second position information, or interchange the first attribute information and the second attribute information, the image processing device further comprising a function selection unit configured to select one of the first interchange unit, the second interchange unit, and the third interchange unit, wherein the selected one of the first interchange unit, the second interchange unit, and the third interchange unit is configured to interchange at least one of the first image information, the first position information, and the first attribute information with at least one of the second image information, the second position information, and the second attribute information.

32. The image processing device according to claim 29, further comprising:

a determining unit configured to determine whether or not one selected image selected by the second selection unit after the second selection unit has selected another selected image is different from the another image; and a setting unit configured to set the another selected image, as the first image, that is selected from the at least two images by the second selection unit, and set the one selected image, as the second image, that is selected from the at least two images by the second selection unit if the determining unit determines that the one selected image is different from the another selected image.

33. The image processing device according to claim 29, further comprising:
a touch panel configured to detect an input corresponding to a contact position or an adjacent position of an indicator on the display, and
wherein each of the first selection unit and the second selection unit is configured to select an image displayed on the display when the touch panel detects the input by the indicator with respect to the image displayed on the display.

34. The image processing device according to claim 22, wherein the display is configured to include a first area configured to display a plurality of templates and a second area configured to display a plurality of images, the first area being adjacent to the second area,
wherein the storage unit is configured to store a plurality of pieces of template information corresponding to respective ones of the plurality of templates individually, each of the plurality of pieces of template information defining a position and shape of each of the plurality of images displayed on the second area,
wherein the display controller is configured to display, on the first area, the plurality of templates in a selectable state based on the plurality of pieces of template information,
wherein the image selection unit is configured to select one template from the plurality of templates displayed on the first area,
wherein the display controller is configured to display, on the second area, a plurality of combined images by combining the plurality of images and the selected one template;
wherein the image selection unit is configured to select at least the first image and the second image from the plurality of combined images displayed on the second area, the first image including first image information, first position and first attribute information, the second image including second image information, second position information and second attribute information;
wherein the information interchange unit is configured to interchange the first image information of the first image and the first position information in association with the first image information with the second image information of the second image and the second position information in association with the second image information, or interchanges the first attribute information of the first image with the second attribute information of the second image, the storage unit storing and correlating the first image information, the first position information, and the second attribute information, and storing and correlating the second image information, the second position information, and the first attribute information,
wherein the display controller is configured to display, on the second area, one image based on the first image information, the first position information, the second attribute information, and the selected one template, and another image based on the second image information, the second position information, the second attribute information, and the selected one template.

35. The image processing device according to claim 34, further comprising a printing unit configured to print the one image and the another image based on a display state in which the one image and the another image are displayed on the second area.

36. The image processing device according to claim 34, wherein the information interchange unit comprises:
a first interchange unit configured to interchange the first image information of the first image and the first attribute information in association with the first image information with the second image information of the second image and the second attribute information in association with the second image information, or interchange the first position information in association with the first image information with the second position information in association with the second image information;
a second interchange unit configured to interchange the first image information and the second image information, or interchange the first position information and the first attribute information with the second position information and the second attribute information; and
a third interchange unit configured to interchange the first image information and the first position information with the second image information and the second position information, or interchange the first attribute information and the second attribute information,
the image processing device further comprising a function selection unit configured to select one of the first interchange unit, the second interchange unit, and the third interchange unit,
wherein the selected one of the first interchange unit, the second interchange unit, and the third interchange unit is configured to interchange at least one of the first image information, the first position information, and the first attribute information with at least one of the second image information, the second position information, and the second attribute information.

37. The image processing device according to claim 34, further comprising:
a determining unit configured to determine whether or not one selected image selected by the second selection unit after the second selection unit has selected another selected image is different from the another selected image; and
a setting unit configured to set the another selected image, as the first image, that is selected from the at least two images by the second selection unit, and set the one selected image, as the second image, that is selected from the at least two images by the second selection unit if the determining unit determines that the one selected image is different from the another selected image.

38. The image processing device according to claim 34, further comprising:
a touch panel configured to detect an input corresponding to a contact position or an adjacent position of an indicator on the display, and
wherein each of the first selection unit and the second selection unit is configured to select an image displayed on the display when the touch panel detects the input by the indicator with respect to the image displayed on the display.

39. A non-transitory computer-readable medium storing a computer-executable image processing program for an image processing device, the image processing device comprising a display configured to display a plurality of images; a storage unit configured to store a plurality of pieces of image information and a plurality of pieces of position information corresponding to respective ones of the plurality of images individually, each of the plurality of pieces of position information indicating a position where each image is displayed on the display, the storage unit being configured to correlate the plurality of pieces of image information with respective ones of the plurality of pieces of position information individually, the plurality of images being to be displayed on the display based on the plurality of pieces of image information and the plurality of pieces of position information, respectively, the image processing program comprising:

instructions for selecting at least a first image and a second image from the plurality of images, the first image including first image information and first position information, the second image including second image information and second position information;

instructions for interchanging the first image information of the first image with the second image information of the second image, or interchanging the first position information of the first image with the second position information of the second image, the storage unit being configured to store and correlate the first image information and the second position information, and store and correlate the second image information and the first position information; and instructions for controlling the display to display one image based on the first image information and the second position information, and another image based on the second image information and the first position information;

wherein, after selecting the first image and the second image, interchanging, automatically, the first image information of the first image with the second image information of the second image, or interchanging, automatically, the first position information of the first image with the second position information of the second image, storing and correlating the first image information and the second position information, and storing and correlating the second image information and the first position information, and controlling, automatically, the display to display the one image based on the first image information and the second position information, and the another image based on the second image information and the first position information.

40. The non-transitory computer-readable medium according to claim 39, wherein the image processing program further comprises instructions for receiving an interchanging request for interchanging display positions of images among the plurality of images displayed on the display, wherein at least the first image and the second image are selected from the plurality of images upon receiving the interchanging request;

wherein the first image information of the first image is interchanged with the second image information of the second image if the second image is selected after the first image is selected;

wherein the first position information of the first image is interchanged with the second position information of the second image if the second image is selected after the first image is selected.

41. The non-transitory computer-readable medium according to claim 40, wherein the image processing program further comprises instructions for setting one selected image, as the first image, that is selected from the plurality of images, and for setting another selected image different from the one selected image, as the second image, that is selected from the plurality of images after the one selected image is set as the first image, the one selected image being not set as the second image if the one selected image is selected in succession after the one selected image has been selected.

42. The non-transitory computer-readable medium according to claim 41, wherein the image processing program further comprises instructions for revoking an image selecting operation in which the one selected image is selected in succession after the one selected image has been selected.

43. The non-transitory computer-readable medium according to claim 40, wherein the storage unit is configured to store attribute information in association with each of the plurality of pieces of image information, the attribute information being used for changing a display state of the image, the first image including first attribute information, the second image including second attribute information;

wherein, if the second image is selected after the first image is selected, the first image information of the first image is interchanged with the second image information of the second image, or the first position information and the first attribute information of the first image are interchanged with the second position information and the second attribute information of the second image, respectively, the first image information, the second position information and the second attribute information being stored in the storage unit and correlated with one another, the second image information, the first position information and the first attribute information being stored in the storage unit and correlated with one another;

wherein one image is displayed based on the first image information, the second position information and the second attribute information, another image being displayed based on the second image information, the first position information and the first attribute information.

44. The non-transitory computer-readable medium according to claim 40, wherein the image processing program further comprises instructions for controlling the display to display each of the plurality of images on each of a plurality of user selectable areas of the display, the user selectable area being specified by a user;

wherein, an image corresponding to the user selectable area is selected based on information outputted from the display and indicating the user selectable area upon receiving the information.

45. The non-transitory computer-readable medium according to claim 40, wherein the image processing program further comprises:

instructions for controlling the display to display a plurality of images on a first area of the display, the display having the first area and a second area adjacent to the first area;

instructions for controlling the display to display, on the second area, at least two images of the plurality of images when the at least two images displayed on the first area are specified by a user; and instructions for controlling the display to display, on the first area, processing information to be used for processing the at least two images in place of the plurality of images that has been displayed on the first area by the first area display unit; and wherein at least the first image and the second image is selected from the at least two images displayed on the second area.

46. The non-transitory computer-readable medium according to claim 45, wherein if the second image is selected after the first image is selected, the first position information and first attribute information of the first image are interchanged with the second position information and second attribute information of the second image, respectively, thereby storing and correlating the first image information, the second position information and the second attribute information in the storing unit and storing and correlating the second image information, the first position information and the first attribute information in the storing unit, the attribute information being used for changing a display state of the image, the first image including the first attribute information, the second image including the second attribute information;

wherein the first image information of the first image is interchanged with the second image information of the second image if the second image is selected after the first image is selected, thereby storing and correlating the first image information, the second position information and the second attribute information in the storing unit and storing and correlating the second image information, the first position information and the first attribute information in the storing unit;

wherein the display is controlled to display one image based on the first image information, the second position information and the second attribute information, and another image based on the second image information, the first position information and the attribute information.

47. The non-transitory computer-readable medium according to claim 45, wherein the image processing program further comprises instructions for controlling the display to display each of the plurality of images on each of a plurality of user selectable areas of the display, the user selectable area being specified by a user;

wherein, an image corresponding to the user selectable area is selected based on information outputted from the display and indicating the user selectable area upon receiving the information.

48. The non-transitory computer-readable medium according to claim 39, wherein the image processing program further comprises:

instructions for controlling the display to display a plurality of images on a first area of the display based on the plurality of pieces of image information, the display having the first area and a second area adjacent to the first area;

instructions for selecting at least two images from the plurality of original images displayed on the first area;

instructions for controlling the display to display, on the second area, the selected at least two images in a display state corresponding to a printing state of the at least two images with respect to a recording medium;

wherein at least the first image and the second image is selected from the at least two images displayed on the second area;

wherein one image is displayed on the second area based on the first image information and the second position information, and another image based on the second image information and the first position information.

49. The non-transitory computer-readable medium according to claim 48, wherein the image processing program further comprises instructions for controlling a printing unit to print the one image and the another image based on the display state in which the one image and the another image are displayed on the second area.

50. The non-transitory computer-readable medium according to claim 48, wherein the storage unit is configured to store attribute information in association with each of the plurality of pieces of image information, the attribute information being used for changing a display state of the image, the first image including first attribute information, the second image including second attribute information;

wherein the first image information of the first image is interchanged with the second image information of the second image, or the first position information and the first attribute information of the first image is interchanged with the second position information and the second attribute information of the second image, respectively, thereby storing and correlating the first image information, the second position information, and the second attribute information in the storage unit, and thereby storing and correlating the second image information, the first position information, and the first attribute information in the storage unit;

wherein one image is displayed on the display based on the first image information, the second position information, and the second attribute information, another image being displayed on the display based on the second image information, the first position information, and the first attribute information.

51. The non-transitory computer-readable medium according to claim 50, wherein at least one of the first image information, the first position information, and the first attribute information is interchanged with at least one of the second image information, the second position information, and the second attribute information by performing one of:

interchanging the first image information of the first image and the first attribute information in association with the first image information with the second image information of the second image and the second attribute information in association with the second image information, or interchanging the first position information in association with the first image information with the second position information in association with the second image information;

interchanging the first image information and the second image information, or interchanging the first position information and the first attribute information with the second position information and the second attribute information; and interchanging the first image information and the first position information with the second image information and the second position information, or interchanging the first attribute information and the second attribute information.

52. The non-transitory computer-readable medium according to claim 48, wherein the image processing program further comprises:

instructions for determining whether or not one selected image selected after another selected image has been selected is different from the another selected image; and instructions for setting the another selected image, as the first image, that is selected from the at least two images, and setting the one selected image, as the second image, that is selected from the at least two images if it is determined that the one selected image is different from the another selected image.

53. The non-transitory computer-readable medium according to claim 39, wherein the storage unit is configured to store a plurality of pieces of template information corresponding to respective ones of the plurality of templates individually, each of the plurality of pieces of template information defining a position and shape of each of the plurality of images displayed on the second area, wherein the image processing program further comprises:

instructions for displaying, on a first area of the display, a plurality of templates in a selectable state based on the plurality of pieces of template information, the display having the first area and a second area adjacent to the first area, the plurality of images being to be displayed on the second area based on the plurality of pieces of image information and the plurality of pieces of position information, respectively;

instructions for selecting one template from the plurality of templates displayed on the first area;

instructions for displaying, on the second area, a plurality of combined images by combining the plurality of images and the selected one template;

instructions for selecting at least the first image and the second image from the plurality of combined images displayed on the second area;

instructions for displaying, on the second area, one image based on the first image information, the second position information, and the selected one template, and another image based on the second image information, the first position information, and the selected one template.

54. The non-transitory computer-readable medium according to claim 53, wherein the image processing program further comprises instructions for controlling a printing unit to print the one image and the another image based on a display state in which the one image and the another image are displayed on the second area.

55. The non-transitory computer-readable medium according to claim 53, wherein the storage unit is configured to store attribute information in association with each of the plurality of pieces of image information, the attribute information being used for changing a display state of the image, the first image including first attribute information, the second image including second attribute information;

wherein the first image information of the first image is interchanged with the second image information of the second image, or the first position information and first attribute information of the first image are interchanged with the second position information and the second attribute information of the second image, respectively, thereby storing and correlating the first image information, the second position information, and the second attribute information in the storage unit, and thereby storing and correlating the second image information, the first position information, and the first attribute information in the storing unit; and wherein one image is displayed on the display based on the first image information, the second position information, the second attribute information, and the selected one template, another image being displayed on the display based on the second image information, the first position information, the first attribute information, and the selected one template.

56. The non-transitory computer-readable medium according to claim 53, wherein at least one of the first image information, the first position information, and the first attribute information is interchanged with at least one of the second image information, the second position information, and the second attribute information by performing one of:

interchanging the first image information of the first image and the first attribute information in association with the first image information with the second image information of the second image and the second attribute information in association with the second image information, or interchanging the first position information in association with the first image information with the second position information in association with the second image information;

interchanging the first image information and the second image information, or interchanging the first position information and the first attribute information with the second position information and the second attribute information; and interchanging the first image information and the first position information with the second image information and the second position information, or interchanging the first attribute information and the second attribute information.

57. The non-transitory computer-readable medium according to claim 53, wherein the image processing program further comprises:

instructions for determining whether or not one selected image selected after another selected image has been selected is different from the another selected image; and instructions for setting the another selected image, as the first image, that is selected from the at least two images, and setting the one selected image, as the second image, that is selected from the at least two images if it is determined that the one selected image is different from the another selected image.

58. A non-transitory computer-readable medium storing a computer-executable image processing program for an image processing device, the image processing device comprising: a display configured to display a plurality of images; a storage unit configured to store a plurality of pieces of image information corresponding to respective ones of the plurality of images, and attribute information corresponding to each of the plurality of pieces of image information, the attribute information being to be used for changing a display state of the image, each of the plurality of images being displayed on the display based on each of the plurality of image information and corresponding attribute information, the image processing program comprising:

instructions for selecting at least a first image and a second image from the plurality of images, the first image including first image information and first attribute information, the second image including second image information and second attribute information;

instructions for interchanging the first image information of the first image with the second image information of the second image, or interchanging the first attribute information of the first image with the second attribute information of the second image, the storage unit being configured to store and correlate the first image information and the second attribute information, and store and correlate the second image information and the first attribute information; and instructions for controlling the display to display one image based on the first image information and the second attribute information, and another image based on the second image information and the first attribute information;

wherein, after selecting the first image and the second image, interchanging, automatically, the first image information of the first image with the second image information of the second image, or interchanging, automatically, the first attribute information of the first image with the second attribute information of the second image, storing and correlating the first image information and the second attribute information, and storing and correlating the second image information and the first attribute information, and controlling, automatically, the display to display the one image based on the first image information and the second attribute information, and the another image based on the second image information and the first attribute information.

59. The non-transitory computer-readable medium according to claim 58, wherein the image processing program further comprises instructions for receiving an interchanging request for interchanging display positions of images among the plurality of images displayed on the display, wherein at least the first image and the second image are selected from the plurality of images upon receiving the interchanging request;

wherein the first image information of the first image is interchanged with the second image information of the second image if the second image is selected after the first image is selected;

wherein the first attribute information of the first image is interchanged with the second attribute information of the second image if the second image is selected after the first image is selected.

60. The non-transitory computer-readable medium according to claim 59, wherein the image processing program further comprises instructions for setting one selected image, as the first image, that is selected from the plurality of images, and for setting another selected image different from the one selected image, as the second image, that is selected from the plurality of images after the one selected image is set as the first image, the one selected image being not set as the second image if the one selected image is selected in succession after the one selected image has been selected.

61. The non-transitory computer-readable medium according to claim 60, wherein the image processing program further comprises instructions for revoking an image selecting operation in which the one selected image is selected in succession after the one selected image has been selected.

62. The non-transitory computer-readable medium according to claim 59, wherein the image processing program further comprises instructions for controlling the display to display each of the plurality of images on each of a plurality of user selectable areas of the display, the user selectable area being specified by a user;

wherein, an image corresponding to the user selectable area is selected based on information outputted from the display and indicating the user selectable area upon receiving the information.

63. The non-transitory computer-readable medium according to claim 58, wherein the image processing program further comprises:

instructions for controlling the display to display a plurality of images on a first area of the display based on the plurality of pieces of image information and the plurality of pieces of attribute information, the display having the first area and a second area adjacent to the first area;

instructions for selecting at least two images from the plurality of original images displayed on the first area;

instructions for controlling the display to display, on the second area, the selected at least two images in a display state corresponding to a printing state of the at least two images with respect to a recording medium;

instructions for controlling the display to display, on the second area, the at least two images selected based on at least two pieces of image information and at least two pieces of position information stored in the storage unit, the at least two pieces of position information each indicating a position where each of the at least two images is displayed on the second area, the at least two pieces of position information being correlated with respective ones of at least two pieces of image information displayed on the second area individually;

instructions for controlling the display to display, on the first area, processing information to be used for processing the at least two images displayed on the second area in place of the plurality of images that has been displayed on the first area; and wherein at least the first image and the second image is selected from the at least two images displayed on the second area.

64. The non-transitory computer-readable medium according to claim 63, wherein the image processing program further comprises instructions for controlling the display to display each of the plurality of images on each of a plurality of user selectable areas of the display, the user selectable area being specified by a user;

wherein, an image corresponding to the user selectable area is selected based on information outputted from the display and indicating the user selectable area upon receiving the information.

65. The non-transitory computer-readable medium according to claim 58, wherein the image processing program further comprises:

instructions for controlling the display to display, on a first area of the display, a plurality of original images based on the plurality of pieces of image information and the plurality of pieces of attribute information, the display having the first area and a second area adjacent to the first area;

instructions for selecting at least two images from the plurality of original images displayed on the first area; and instructions for controlling the display to display, on the second area, the at least two images in a display state corresponding to a printing state of the at least two images with respect to a recording medium, the storage unit being configured to store at least two pieces of position information each indicating a position where each of the at least two images is displayed on the second area and to correlate the at least two pieces of position information with respective ones of at least two pieces of image information displayed on the second area individually, wherein at least the first image and the second image are selected from the at least two images displayed on the second area, the first image including first image information, first attribute information, and first position information, the second image including second image information, second attribute information, and second position information, wherein the first image information of the first image and the first position information in association with the first image information are interchanged with the second image information of the second image and the second position information in association with the second image information, or the first attribute information of the first image are interchanged with the second attribute information of the second image, thereby storing and correlating the first image information and the first position information, and the second attribute information in the storage unit, and storing and correlating the second image information, the second position information, and the first attribute information in the storage unit, wherein one image is displayed on the second area based on the first image information, the first position information, and the second attribute information, another image being displayed on the second area based on the second image information, the second position information, and the first attribute information.

66. The non-transitory computer-readable medium according to claim 65, wherein the image processing program further comprises instructions for controlling a printing unit to print the one image and the another image based on a display state in which the one image and the another image are displayed on the second area.

67. The non-transitory computer-readable medium according to claim 65, wherein at least one of the first image information, the first position information, and the first attribute information is interchanged with at least one of the second image information, the second position information, and the second attribute information by performing one of:
  interchanging the first image information of the first image and the first attribute information in association with the first image information with the second image information of the second image and the second attribute information in association with the second image information, or interchanging the first position information in association with the first image information with the second position information in association with the second image information;
  interchanging the first image information and the second image information, or interchanging the first position information and the first attribute information with the second position information and the second attribute information; and
  interchanging the first image information and the first position information with the second image information and the second position information, or interchanging the first attribute information and the second attribute information.

68. The non-transitory computer-readable medium according to claim 65, wherein the image processing program further comprises:
  instructions for determining whether or not one selected image selected after another selected image has been selected is different from the another selected image; and
  instructions for setting the another selected image, as the first image, that is selected from the at least two images, and setting the one selected image, as the second image, that is selected from the at least two images if it is determined that the one selected image is different from the another selected image.

69. The non-transitory computer-readable medium according to claim 58, wherein the storage unit is configured to store a plurality of pieces of template information corresponding to respective ones of the plurality of templates individually, each of the plurality of pieces of template information defining a position and shape of each of the plurality of images displayed on the second area,
  wherein the image processing program further comprises:
  instructions for displaying, on a first area of the display, a plurality of templates in a selectable state based on the plurality of pieces of template information, the display having the first area and a second area adjacent to the first area, the plurality of images being displayed on the second area based on the plurality of pieces of image information and the plurality of pieces of position information, respectively;
  instructions for selecting one template from the plurality of templates displayed on the first area;
  instructions for displaying, on the second area, a plurality of combined images by combining the plurality of images and the selected one template;
  instructions for selecting at least the first image and the second image from the plurality of combined images displayed on the second area, the first image including first image information, first position information and first attribute information, the second image including second image information, second position information and second attribute information;
  instructions for interchanging the first image information of the first image and the first position information in association with the first image information with the second image information of the second image and the second position information in association with the second image information, or interchanging the first attribute information of the first image with the second attribute information of the second image, thereby storing and correlating the first image information, the first position information, and the second attribute information in the storage unit, and storing and correlating the second image information, the second position information, and the first attribute information in the storage unit; and
  instructions for displaying, on the second area, one image based on the first image information, the second position information, and the selected one template, and another image based on the second image information, the first position information, and the selected one template.

70. The non-transitory computer-readable medium according to claim 69, wherein the image processing program further comprises instructions for controlling a printing unit to print the one image and the another image based on a display state in which the one image and the another image are displayed on the second area.

71. The non-transitory computer-readable medium according to claim 69, wherein at least one of the first image information, the first position information, and the first attribute information is interchanged with at least one of the second image information, the second position information, and the second attribute information by performing one of:
  interchanging the first image information of the first image and the first attribute information in association with the first image information with the second image information of the second image and the second attribute information in association with the second image information, or interchanging the first position information in association with the first image information with the second position information in association with the second image information;
  interchanging the first image information and the second image information, or interchanging the first position information and the first attribute information with the second position information and the second attribute information; and
  interchanging the first image information and the first position information with the second image information and the second position information, or interchanging the first attribute information and the second attribute information.

72. The non-transitory computer-readable medium according to claim 54, wherein the image processing program further comprises:
  instructions for determining whether or not one selected image selected after another selected image has been selected is different from the another selected image; and
  instructions for setting the another selected image, as the first image, that is selected from the at least two images, and setting the one selected image, as the second image, that is selected from the at least two images if it is determined that the one selected image is different from the another selected image.

* * * * *